United States Patent
Neiser

(10) Patent No.: US 11,519,434 B2
(45) Date of Patent: Dec. 6, 2022

(54) APPARATUS AND METHOD FOR FLUID MANIPULATION

(71) Applicant: Paul Neiser, Mountain View, CA (US)

(72) Inventor: Paul Neiser, Mountain View, CA (US)

(*) Notice: Subject to any disclaimer, the term of this patent is extended or adjusted under 35 U.S.C. 154(b) by 660 days.

(21) Appl. No.: 16/101,391

(22) Filed: Aug. 10, 2018

(65) Prior Publication Data

US 2019/0048904 A1 Feb. 14, 2019

Related U.S. Application Data

(60) Provisional application No. 62/714,778, filed on Aug. 6, 2018, provisional application No. 62/703,898, filed on
(Continued)

(51) Int. Cl.
   *F15D 1/00* (2006.01)
   *B64C 29/00* (2006.01)
(Continued)

(52) U.S. Cl.
   CPC .............. *F15D 1/008* (2013.01); *B63B 1/06* (2013.01); *B63B 1/40* (2013.01); *B64C 1/0009* (2013.01);
(Continued)

(58) Field of Classification Search
   CPC .... B63B 1/06; B63B 1/40; B63H 5/08; B64C 1/0009; B64C 11/001; B64C 11/48; B64C 27/10; B64C 27/20; B64C 29/0025; B64C 2230/04; B64D 27/20; F01D 7/00; F01D 13/00; F01D 15/10; F02K 1/52; F03D 1/025; F15D 1/008; F15D 1/0095; F05B 2260/97; F05D 2260/97
   See application file for complete search history.

(56) References Cited

U.S. PATENT DOCUMENTS

| | | |
|---|---|---|
| 1,459,495 A | 6/1923 | Bennie |
| 2,379,355 A | 6/1945 | Hodgdon |

(Continued)

FOREIGN PATENT DOCUMENTS

| | | |
|---|---|---|
| DE | 29916203 U1 | 11/2000 |
| DE | 102006026230 A1 | 12/2007 |

(Continued)

OTHER PUBLICATIONS

Cone, Jr., The Theory of Induced Lift and Minimum Induced Drag of Nonplanar Lifting Systems, NASA Technical Report R-139, 1962.
(Continued)

*Primary Examiner* — Courtney D Heinle
*Assistant Examiner* — Sang K Kim

(57) ABSTRACT

An intentional fluid manipulation apparatus (IFMA) assembly with a first thrust apparatus that imparts a first induced velocity to a local free stream flow during a nominal operation requirement. The first thrust apparatus creates a streamtube. A second thrust apparatus is located in a downstream portion of the streamtube. The second thrust apparatus imparts a second induced velocity to the local free stream flow. The second induced velocity at the location of the second thrust apparatus has a component in a direction opposite to the direction of the first induced velocity at the location of the second thrust apparatus.

26 Claims, 19 Drawing Sheets

Related U.S. Application Data on Jul. 27, 2018, provisional application No. 62/685,295, filed on Jun. 15, 2018, provisional application No. 62/543,371, filed on Aug. 10, 2017.

(51) Int. Cl.

| | |
|---|---|
| *B64C 27/20* | (2006.01) |
| *B64C 11/48* | (2006.01) |
| *B64C 11/00* | (2006.01) |
| *B63B 1/06* | (2006.01) |
| *F02K 1/52* | (2006.01) |
| *B63B 1/40* | (2006.01) |
| *F01D 13/00* | (2006.01) |
| *F01D 15/10* | (2006.01) |
| *F01D 7/00* | (2006.01) |
| *B64C 1/00* | (2006.01) |
| *B64D 27/20* | (2006.01) |
| *F03D 1/02* | (2006.01) |
| *B63H 5/00* | (2006.01) |
| *B63J 3/04* | (2006.01) |
| *B63H 5/08* | (2006.01) |
| *B64C 27/10* | (2006.01) |

(52) U.S. Cl.
CPC ............ *B64C 11/001* (2013.01); *B64C 11/48* (2013.01); *B64C 27/20* (2013.01); *B64C 29/0025* (2013.01); *B64D 27/20* (2013.01); *F01D 7/00* (2013.01); *F01D 13/00* (2013.01); *F01D 15/10* (2013.01); *F02K 1/52* (2013.01); *F03D 1/025* (2013.01); *F15D 1/0095* (2013.01); *B63H 5/08* (2013.01); *B63H 2005/005* (2013.01); *B63J 2003/046* (2013.01); *B64C 27/10* (2013.01); *B64C 2230/04* (2013.01); *F05B 2260/97* (2013.01); *F05D 2260/97* (2013.01)

(56) References Cited

U.S. PATENT DOCUMENTS

| | | | |
|---|---|---|---|
| 2,672,115 | A | 3/1954 | Conover |
| 3,409,249 | A | 6/1966 | Bergquist et al. |
| 4,483,658 | A | 11/1984 | Levine |
| 4,936,748 | A | 6/1990 | Adamson et al. |
| 5,054,998 | A * | 10/1991 | Davenport ............ B64D 33/04 416/1 |
| 5,782,427 | A | 7/1998 | Hermach |
| 5,803,410 | A | 9/1998 | Hwang |
| 6,170,778 | B1 | 1/2001 | Cycon et al. |
| 6,203,269 | B1 | 3/2001 | Lorber et al. |
| 6,492,743 | B1 | 12/2002 | Appa |
| 6,725,797 | B2 | 4/2004 | Hilleman |
| 7,018,166 | B2 | 3/2006 | Gaskell |
| 8,286,909 | B2 | 10/2012 | Lee |
| 8,640,985 | B2 | 2/2014 | Brunken, Jr. |
| 9,694,911 | B2 | 7/2017 | Bevirt et al. |
| 9,994,305 | B1 * | 6/2018 | Moldovan ............ B64C 31/024 |
| 10,377,483 | B2 * | 8/2019 | Champagne, Jr. .... B64C 39/024 |
| 10,696,394 | B2 * | 6/2020 | Chang ..................... B64C 37/02 |
| 2004/0129833 | A1 | 7/2004 | Perlo et al. |
| 2006/0186261 | A1 | 8/2006 | Unzicker |
| 2006/0202082 | A1 | 9/2006 | Alvi |
| 2007/0130913 | A1 | 6/2007 | Harrison |
| 2011/0305572 | A1 * | 12/2011 | Bellis .................. B64C 11/48 416/129 |
| 2014/0044535 | A1 | 2/2014 | David |
| 2014/0353419 | A1 * | 12/2014 | Prud'Homme-Lacroix ................ B64C 27/82 244/6 |
| 2015/0000252 | A1 | 1/2015 | Moore et al. |
| 2015/0284070 | A1 | 10/2015 | Breeze-Stringfellow et al. |
| 2017/0166306 | A1 | 6/2017 | Engbersen et al. |
| 2018/0162525 | A1 | 6/2018 | St. Clair et al. |

FOREIGN PATENT DOCUMENTS

| | | |
|---|---|---|
| DE | 102013015364 A1 | 3/2015 |
| FR | 534801 | 4/1922 |
| FR | 2993859 A1 | 1/2017 |
| GB | 1197850 A | 7/1970 |
| GB | 2179405 A | 3/1987 |
| GB | 2468917 A | 9/2010 |
| GB | 2542184 A | 3/2017 |
| KR | 101446106 B1 | 10/2014 |
| WO | 2015/198296 A2 | 12/2015 |

OTHER PUBLICATIONS

Eppler, Induced Drag and Winglets, Technical Soaring, vol. 20, No. 3, p. 89-96, 1996.
Kroo et al., Highly Nonplanar Lifting Systems, Transportation Beyond 2000: Technologies Needed for Engineering Design; p. 331-370; NASA-CP-10184-Pt-1, Feb. 1, 1996.
Borer et al., Design and Performance of the NASA Sceptor Distributed Electric Propulsion Flight Demonstrator, 16th AIAA Aviation Technology, Integration, and Operations Conference; Jun. 13-17, 2016; Washington, DC; United States, Pub. Jun. 13, 2016.
Prandtl, Induced Drag of Multiplanes, NACA TN 182, 1924.
Ameyugo et al., Distributed Propulsion Feasibility Studies, International Congress of the Aeronautical Sciences, 2006.
Kroo, Drag due to Lift: Concepts for Prediction and Reduction, Annual Reviews Fluid Mechanics vol. 33, pp. 587-617, 2001.
Demasi, Aerodynamic Analysis of Non-conventional Wing Configurations for Aeroelastic Applications, Ph.D. Dissertation, Dipartimento di Ingegneria Aeronautica e Spaziale, Turin, Italy, Mar. 2004.
Helios Prototype, NASA Armstrong Fact Sheet, https://www.nasa.gov/centers/armstrong/news/FactSheets/FS-068-DFRC.html, Feb. 28, 2014.
Bauhaus Luftfahrt, Concept study "Propulsive Fuselage": Adding an extra engine to reduce emissions, https://www.bauhaus-luftfahrt.net/en/topthema/propulsive-fuselage/, May 19, 2014.
Sanders et al., "V/STOL Propulsion", Aircraft Propulsion, NASA SP-259,1971, pp. 135-168.
International Search Report and Written Opinion of the ISA, PCT/US2018/046380, dated Dec. 6, 2018.
Leishman, Principles of Helicopter Aerodynamics—Second edition. Cambridge university press, 2006, p. 60-64, p. 81-83.
Johnson, Helicopter Theory. Dover Publications, Inc., 1994, p. 28-34.
Wikipedia, "Freestream", https://en.wikipedia.org/wiki/Freestream, accessed May 26, 2022.
Anderson, Fundamentals of Aerodynamics—Fifth edition. McGraw-Hill., 2012, p. 20.
Mcgrath, Univ. of Arizona, AME 230 Course Materials, Chapter 4—Lecture 1 Notes, 2008, http://www.u.arizona.edu/~jmcgrath/In.ch4.notes1.pdf.
Connor, "What is Control Volume—Control Volume Analysis—Definition", (May 22, 2019), https://www.thermal-engineering.org/what-is-control-volume-control-volume-analysis-definition/.

* cited by examiner

APPARATUS AND METHOD FOR FLUID MANIPULATION

This application claims the benefit of U.S. Provisional Application No. 62/543,371, filed Aug. 10, 2017, No. 62/685,295, filed Jun. 15, 2018, and No. 62/703,898, filed Jul. 27, 2018, each being incorporated by reference herein. This application also claims the benefit of U.S. Provisional Application No. 62/714,778, filed Aug. 6, 2018.

BACKGROUND

Many fluid interaction apparatuses suffer from large power consumption at low free stream flow velocities. For example, with helicopters, the power required during hover can be on the order of twice as large as the power consumed during a nominal level cruise. A propeller of a conventional fixed wing aircraft, or a turbofan of a commercial jet airliner, consumes a larger amount of power for a given thrust magnitude at small free stream flow velocities, such as those found during takeoff, compared to larger free stream flow velocities, such as those found during nominal level cruise. Similarly, the amount of power a conventional, open rotor wind turbine is able to extract from a fluid is unnecessarily small.

Attempts to mitigate these inefficiencies in thrust production or power extraction associated with comparatively low free stream flow velocity magnitudes are limited in effectiveness. For example, a duct can be employed to increase the local free stream flow velocity of a propeller, helicopter rotor, or wind turbine. The magnitude of this increase is determined by the geometry of the duct, which in turn is severely limited by constraints, such as constraints pertaining to flow separation. These constraints are particularly severe for small free steam flow velocities, i.e., the very regime in which the duct would be needed the most. Due to these constraints, a large effect on the local free stream flow may only be achievable with a duct with a large diffuser, which can be associated with a prohibitively large wetted area and added weight, for instance.

An object, such as a fuselage, moving relative to a fluid typically encounters a friction force, or a drag force. In the prior art, attempts to minimize this drag force are typically limited to ensuring the wetted surface of the object is as smooth as possible. In some cases, such smoothness can favor laminar flow over at least a portion of the wetted surface, which can help to reduce the viscous drag force. This drag force can be substantial even in the presence of laminar flow, however.

BRIEF SUMMARY OF THE INVENTION

In accordance with some embodiments, a fluid manipulation apparatus, such as a helicopter main rotor system, can be configured to reduce the power consumed during hover compared to a conventional helicopter rotor system, and increase the hovering endurance, for example. These principles also increase the efficiency of thrust production or power extraction of other types of fluid interaction apparatuses, such as propellers or wind turbines. In some embodiments, the modification comprises an increase in the local free stream flow velocity of at least a portion of a thrust producing or power extracting fluid interaction apparatus.

The aforementioned viscous drag force is a function of the local free stream velocity of the fluid relative to the wetted surface of the object. In accordance with some embodiments, a fluid manipulation apparatus can be configured to modify the local free stream velocity of the fluid relative to the wetted surface of the object, and reduce the viscous drag force. In some embodiments, the modification comprises a reduction in the local free stream flow velocity of at least a portion of the wetted surface of the object.

Some embodiments include an intentional fluid manipulation apparatus and/or a related method, where a thrust apparatus assembly with an upstream thrust apparatus can be configured to produce an intended force, or thrust, in a first direction relative to the free stream flow during nominal operation. The thrust apparatus assembly can also include at least a downstream thrust apparatus, where the downstream thrust apparatus is placed at least partially in at least a portion of the downstream streamtube of the upstream thrust apparatus. The downstream thrust apparatus can be configured to produce a thrust with at least a vector component parallel to the direction of the induced velocity vector of the upstream thrust apparatus at the location of the downstream thrust apparatus in the streamtube of the upstream thrust apparatus. The thrust of the downstream thrust apparatus can meet this direction criterion over at least a portion of the area of overlap between the streamtube of the upstream thrust apparatus and the streamtube of the downstream thrust apparatus. The thrust apparatus assembly can include at least two thrust apparatuses.

In some embodiments, the streamtube can be curved by external lifting apparatuses or thrust apparatuses. In some embodiments, the induced velocity vector of the upstream thrust apparatus at the location of the downstream thrust apparatus need no longer be aligned with the thrust experienced by the upstream thrust apparatus. In some embodiments, it can also no longer be aligned with the induced velocity vector of the upstream thrust apparatus at the location of the upstream thrust apparatus. In some embodiments, the induced velocity vector of the downstream thrust apparatus at the location of the downstream thrust apparatus can be configured to have at least a component in a direction opposite the induced velocity vector of the upstream thrust apparatus at that location. In some embodiments, the thrust experienced by the downstream thrust apparatus therefore does not have to have a component in the opposite direction of the thrust of the upstream thrust apparatus.

Further embodiments include an intentional fluid manipulation apparatus and/or a related method, in which a thrust apparatus assembly with an upstream thrust apparatus can be configured to impart a first rate of change of momentum in at least an intended direction relative to the free stream flow velocity vector. The thrust apparatus assembly can include at least a downstream thrust apparatus, where the downstream thrust apparatus can be placed at least partially in at least a portion of the downstream streamtube of the upstream thrust apparatus. The downstream thrust apparatus can be configured to impart a second rate of change of momentum on the fluid in the streamtube of the upstream thrust apparatus, where the direction of this second rate of change of momentum has at least a component in the opposite direction of the effect of the first rate of change of momentum on the fluid in the streamtube of the upstream thrust apparatus for at least a portion of the area of overlap between the streamtube of the upstream thrust apparatus and the streamtube of the downstream thrust apparatus.

Further embodiments include an intentional fluid manipulation apparatus and/or a related method, in which a thrust apparatus assembly can include an upstream thrust apparatus configured to deliver an intended amount of induced power to a fluid. The thrust apparatus assembly can include at least a downstream thrust apparatus, where the downstream thrust apparatus is placed at least partially in at least a portion of the downstream streamtube of the upstream thrust apparatus. The downstream thrust apparatus can be configured to extract an intended amount of induced power from the fluid over at least a portion of the area of overlap between the streamtube of the upstream thrust apparatus and the streamtube of the downstream thrust apparatus.

Further embodiments include an intentional fluid manipulation apparatus and/or a related method, in which a thrust apparatus assembly includes an upstream thrust apparatus configured to extract an intended amount of induced power from a fluid. The thrust apparatus assembly can include at least a downstream thrust apparatus. The downstream thrust apparatus can be placed at least partially in at least a portion of the downstream streamtube of the upstream thrust apparatus, and where the downstream thrust apparatus can be configured to deliver an intended amount of induced power to the fluid over at least a portion of the area of overlap between the streamtube of the upstream thrust apparatus and the streamtube of the downstream thrust apparatus.

Further embodiments include another intentional fluid manipulation apparatus (IFMA) assembly. The IFMA can include a first thrust apparatus configured to impart a first induced velocity to a local free stream flow during a nominal operation requirement, the first thrust apparatus creating a streamtube. A second thrust apparatus can be included. The second thrust apparatus can be located in a downstream portion of the streamtube. The second thrust apparatus can be configured to impart a second induced velocity to the local free stream flow. The second induced velocity at the location of the second thrust apparatus can have a component in a direction opposite to the direction of the first induced velocity at the location of the second thrust apparatus.

In some embodiments, the second thrust apparatus can be configured to produce the second thrust with a vector component parallel to, and aligned with, the direction of an induced velocity vector of the first thrust apparatus at the location of the second thrust apparatus in the streamtube.

In some embodiments, the thrust of the second thrust apparatus can be calculated over at least a portion of an area of overlap between the streamtube of the upstream thrust apparatus and a second streamtube of the second thrust apparatus.

In some embodiments, the nominal operation requirement can be for providing a net thrust, wherein the net thrust is equal to a first thrust vector of the first thrust apparatus plus a second thrust vector of the second thrust apparatus in an inertial frame.

In some embodiments, an induced power required for the production of the net thrust can be reduced compared to a scenario in which the second thrust apparatus has a negligible effect on the fluid flow.

In some embodiments, at least a portion of one of the first or second thrust apparatuses can extract power from a non-zero free stream flow.

In some embodiments, a boundary apparatus can spatially separate the first thrust apparatus from the second thrust apparatus.

In some embodiments, the first and second thrust apparatuses can be configured to reduce drag losses of the boundary apparatus.

In some embodiments, the first and second thrust apparatuses can include open rotors or ducted rotors.

Further embodiments include another intentional fluid manipulation apparatus (IFMA) assembly. The IFMA can include a boundary apparatus having an outside surface. The boundary apparatus can be configured to move relative to a surrounding fluid. An intentional momentum carrying apparatus (IMCA) can be coupled to the boundary apparatus frame. The IMCA can be coupled to the boundary apparatus in a manner to reduce a flow velocity gradient in the proximity of the outside surface of the boundary apparatus frame.

In some embodiments, the IMCA can be one of a plurality of IMCAs coupled to the boundary apparatus frame, and the plurality of IMCAs can be coupled to the boundary apparatus in a manner to reduce flow velocity gradient in the proximity of the outside surface of the boundary apparatus frame.

In some embodiments, the plurality of IMCAs can include a leading IMCA located upstream of the boundary apparatus frame, the leading IMCA can be configured to generate a streamtube that extends from a trailing edge of the leading IMCA to encompass the boundary apparatus frame.

In some embodiments, the plurality of IMCAs can include one or more of a middle IMCA located around a portion of the boundary apparatus frame, the middle IMCA is not in the wake of the upstream IMCA.

In some embodiments, the middle IMCA can be configured to cause the streamtube to be incident on a leading edge stagnation line of the middle IMCA.

In some embodiments, the plurality of IMCAs can include a trailing IMCA located downstream of the boundary apparatus frame, the trailing IMCA being configured to encompass the streamtube from the middle IMCA at a leading edge of the trailing IMCA.

In some embodiments, the plurality of IMCAs can include a plurality of circular ducts.

In some embodiments, the each duct of the plurality of ducts can be configured to produce a lift force with a component in a radially outward direction with respect to an axis of direction the boundary apparatus is configured to move relative to.

In some embodiments, the plurality of IMCAs can be configured to reduce the magnitude of the flow velocity at the outside surface of the boundary apparatus in a full-slip scenario.

In some embodiments, the reduction of the magnitude of the flow velocity can result in a lower skin drag at the outside surface in a no-slip scenario.

Further embodiments include an aircraft. The aircraft can have wings and a fuselage. A downstream thrust apparatus can be affixed to the fuselage. The down stream thrust apparatus can be configured to apply a first thrust vector. The aircraft can have a flight direction along a direction of a first thrust vector during nominal level cruise.

In some embodiments, an upstream thrust apparatus can be affixed to the fuselage. The upstream thrust apparatus can be configured to apply a second thrust vector opposite to the first thrust vector. The second thrust vector can reduce the spatial flow velocity gradients in a vicinity of the fuselage during nominal level cruise.

In some embodiments, the upstream thrust apparatus can include a ducted fan configured to decelerate fluid flow prior to encountering a fan disc located within the ducted fan.

In some embodiments, the upstream thrust apparatus can be configured to extract energy from the fluid flow.

In some embodiments, the upstream thrust apparatus can be configured to electrically or mechanically transfer at least a portion of the energy to the downstream thrust apparatus.

In some embodiments, the magnitude of the first thrust vector can be larger than the magnitude of the second thrust vector.

Further embodiments include a fluid manipulation apparatus that can have a boundary apparatus having a surface configured for interacting with a fluid. An intentional fluid manipulation apparatus (IFMA) assembly can be coupled to the boundary apparatus. The IFMA assembly can be configured to decrease the spatial flow velocity gradients in the vicinity of the surface of the boundary apparatus.

In some embodiments, the IFMA assembly can include at least one intentional momentum carrying apparatus (IMCA) coupled to the boundary apparatus frame.

In some embodiments, the at least one IMCA can be one of a plurality of IMCAs coupled to the boundary apparatus frame In some embodiments, the IFMA assembly can include an upstream intentional momentum shedding apparatus (IMSA) configured to impart a first induced velocity to the local free stream flow.

In some embodiments, the IFMA assembly can include a downstream IMSA configured to impart a second induced velocity to the local free stream flow.

In some embodiments, a thrust vector can be associated with at least one of the upstream IMSA and downstream IMSA is in substantially the same direction as the local free stream flow.

In some embodiments, the boundary apparatus can be located between the upstream IMSA and the downstream IMSA.

In some embodiments, at least one of the upstream IMSA and downstream IMSA can be configured to extract energy from the fluid flow.

In some embodiments, energy can be electrically or mechanically transferred between the upstream IMSA and downstream IMSA.

In some embodiments, at least one of the upstream IMSA and downstream IMSA can include a propeller.

In some embodiments, the decreased velocity of the local free stream flow can reduce drag of the boundary apparatus.

In some embodiments, velocity of the local free stream flow of the boundary apparatus can be reduced.

DETAILED DESCRIPTION

Figure 1:
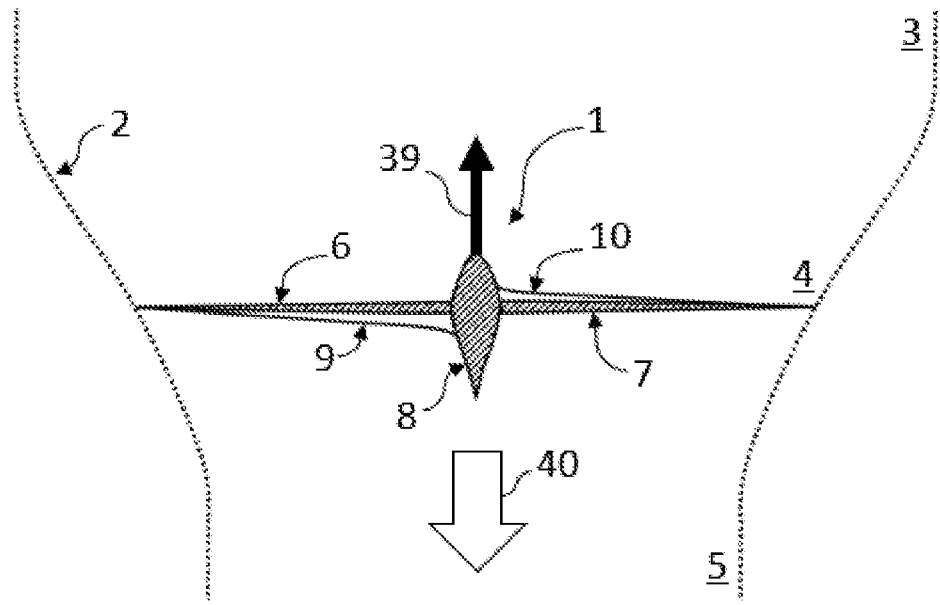
FIGS. 1 and 2 are cross-sectional views of a prior art thrust apparatuses.

The term "fluid" used herein encompasses all types of materials that exhibit the properties of a fluid. One such property is the ability of constituent particles to move relative to each other. It can refer to a liquid such as water, or a gas such as air, for example. Note that a fluid can comprise several different types and species of fluid simultaneously, such as air, which consists of several types of gas. Unless specified, the assembly of different fluids will still be referred to as "the fluid" for simplicity.

The term "free stream flow" is defined as the theoretical flow relative to a specified point that would occur if a body, such as an assembly of apparatuses, did not interact with the fluid. It can thus also be referred to as a global free stream flow. An assembly of apparatuses can be a vehicle, such as an aircraft or a ship, or a different type of fluid manipulation apparatus, such as a wind turbine, for example, or any portion of such an assembly. The free stream flow can comprise contributions from the motion of a specified point in inertial space, such as the motion of a vehicle in inertial space. It can also comprise contributions from the motion of the fluid in inertial space, such as wind or currents. Different specified points can experience different free stream flows. For example, an apparatus could rotate, such that different points on the apparatus move at different velocities in inertial space and experience different free stream flow velocities in a fluid that is theoretically stationary in inertial space.

The term "local free stream flow" is defined as the theoretical flow relative to a specified apparatus that would occur if only the specified apparatus did not interact with the fluid. The local free stream flow comprises a contribution of the free stream flow as well as a contribution due to other apparatuses, such as those of the remainder of an assembly, interacting with the fluid. For example, the downwash created by a horizontal fixed wing could affect the local free stream flow velocity magnitude and direction relative to a horizontal stabilizer mounted downstream of the wing.

A "fluid manipulation apparatus", or FMA, is defined as an apparatus that manipulates the properties of a fluid. For example, an FMA could change the magnitude of the flow velocity of a fluid element relative to the magnitude of a free stream flow velocity for a specified scenario or boundary condition. In another example, an FMA could change the direction of the fluid flow velocity of a fluid element relative to a free stream flow velocity direction for a specified scenario. This effect on the fluid flow can be intentional or unintentional. When at least some of the effect on the fluid is intentional, the FMA can be further classified as an "intentional fluid manipulation apparatus", or IFMA. The intentional effect on the fluid flow can only be localized for some IFMAs, as in the case of an "intentional momentum carrying apparatus", or IMCA, defined below. For other IFMAs, the intentional effect on the fluid flow can also occur in the far wake, as can be the case for an "intentional momentum shedding apparatus", or IMSA. These definitions will be clarified in the following paragraphs.

Due to the intentional nature of the momentum shedding, and IMSA can also be referred to as a "thrust apparatus", or TA, which is defined as any apparatus configured to impart an intentional rate of change of momentum to a fluid during nominal operation. An example of a TA is a conventional propeller or a helicopter main rotor. The wing of a fixed wing aircraft that provides lift during nominal constant speed cruise can also be regarded a thrust apparatus. There are many other possible types of TAs available. For example, the rate of change of momentum could be applied to the fluid by a TA via electromagnetic forces. For example, the TA can be a Hall-effect thruster, or a magnetohydrodynamic (MHD) drive. A Voith Schneider thruster, a cyclogyro, or a similar device are also examples of a TA.

In the aforementioned definition of a thrust apparatus, the requirement of imparting an intentional rate of change of momentum to a fluid can be described in several ways. For example, consider a thrust apparatus in isolation from other fluid manipulation apparatuses in an assembly of apparatuses. For instance, consider a wing in isolation from the remainder of a fixed wing aircraft. Or consider a helicopter main rotor in isolation from the remainder of a conventional helicopter. In a theoretical scenario, denoted the "isolated scenario", a thrust apparatus is considered in isolation and defined or characterized by the fact that there is an intentional, non-zero induced flow in the far wake relative to the thrust apparatus during a nominal operating condition.

The nominal operating condition can, in some instances, involve a free stream flow velocity magnitude and direction which is uniform in space and time. In some examples, the operating conditions during constant velocity cruise can be described as a nominal operating condition. The far wake is located an infinite distance from the thrust apparatus in this nominal operating condition. In other words, the thrust apparatus has an intentional, non-negligible effect on the flow field an infinite distance from the thrust apparatus compared to the free stream flow field.

The term "intentional" as defined and used herein, refers to the requirement that the rate of change of momentum be useful or deliberate. For example, a useful rate of change of momentum can contribute to an average induced velocity of a fluid element in the far wake in the aforementioned isolated scenario, where the velocity has a non-zero component in a direction opposite to the direction of the intended thrust or lift. For some thrust apparatuses, the average induced velocity of a fluid element in the far wake has a substantial component in a direction opposite to the direction of the intended thrust or lift. The far wake induced flow of a fixed wing or a helicopter main rotor which is associated with the production of lift or thrust is considered intentional. The associated rate of change of momentum of the fluid in the proximity of the thrust apparatus is also considered intentional. An intentional effect of a thrust apparatus on the far wake is distinguished from unintentional, not useful, or counter-productive effects on the fluid flow field in the far wake, which can be associated with profile drag, pressure drag acting on some elements of the thrust apparatus, for instance. These unintentional effects increase the power consumption unnecessarily, i.e. compared to a theoretical situation in which these effects are mathematically removed, ceteris paribus.

The requirement of imparting an intentional rate of change of momentum to a fluid can also be described in another way. For example, a thrust apparatus can also be defined as any apparatus which can be considered to intentionally shed vortices in the simplified framework of Prandtl lifting-line theory. A thrust apparatus, or TA, or IMSA, can therefore also be described as an "intentional vortex shedding apparatus", or IVSA. Note that the framework of lifting-line theory should only be considered as a reference or a guide, since it relies on simplified assumptions, such as inviscid and incompressible flow. The vortices which are intentionally or deliberately shed by a thrust apparatus contribute to the lift or thrust force acting on the thrust apparatus by imparting a rate of change of momentum to a fluid. When a thrust apparatus is considered in the aforementioned isolated scenario during nominal operating conditions, the intentionally shed vortices are also present an infinite distance from the thrust apparatus, where they generate an intentional induced flow. In other words, there is a non-zero, intentional, far wake induced flow velocity on account of, or produced by, the thrust apparatus. Note that a thrust apparatus can also be considered to shed vortices unintentionally in some models, such as mathematical models taking into account viscous drag or boundary layer effects in the form of theoretical shed vortices. Unintentional vortex shedding refers to any vortices which are not shed deliberately, i.e. any vortices which do not perform, or contribute to, a useful function such as the generation of lift or thrust.

An intentional momentum carrying apparatus, or IMCA, is a fluid manipulation apparatus which, when considered in an isolated scenario, does not intentionally shed momentum into the far wake. An example of an IMCA is a duct or a conventional tubular, or cigar shaped, axially symmetric fuselage. A fuselage modifies the free stream flow by intentionally deflecting the flow around the fuselage, which also increases the magnitude of the velocity of the flow in the proximity of the fuselage for the isolated scenario in which the fuselage is considered in isolation of any other fluid manipulation apparatuses, such as wings, for a nominal operating condition, such as constant velocity cruise. The aforementioned intentional deflection of the flow is localized to the vicinity of the fuselage. Thus, a fluid element in the proximity of a fuselage experiences an intentional, localized rate of change of momentum. In the ideal case, there is no effect on the fluid flow at an infinite distance from the fuselage. In other words, there is no intentional far wake effect on the fluid flow due to the fuselage. There can be an unintentional rate of change of momentum of the fluid in the proximity of the fuselage, which can also be associated with an unintentional change of momentum of a fluid element an infinite distance from the fuselage in the isolated scenario compared to the free stream flow. Such an unintentional change in the fluid flow in the far wake can arise from profile drag effects, for example.

Similarly, a duct modifies the free stream flow by intentionally modifying the magnitude of the flow velocity in the proximity of the duct. For example, a duct can be configured to reduce the magnitude of the flow velocity of a fluid element at the center of the circular duct relative to the free stream flow for an isolated scenario during nominal operating conditions. In this case the nominal operating conditions can refer to a constant and uniform free stream flow velocity parallel to the central axis of symmetry of the duct. This intentional modification is only localized in the proximity of the duct, and converges to a negligible value an infinite distance from the center of the duct. Thus, there is no intentional far wake effect on the fluid flow due to the duct, i.e. there is no far wake intentional induced flow velocity of a fluid element due to the interaction of the duct with the fluid. As before, there can be an unintentional modification of the fluid flow in the far wake, and associated unintentional rate of change of momentum of the fluid in the proximity of the duct, due to drag forces or transient effects.

An IMCA can also be described in the simplified framework of lifting-line theory. An IMCA can be considered to carry an enclosed or bound vorticity. As such, an IMCA can also be considered to be an "intentional vortex carrying apparatus", or IVCA. For example, the intentional effect of a circular, axially symmetric duct on the fluid can be modelled as a circular vortex ring, or a two- or three-dimensional continuous distribution of vorticity, or incrementally small, discrete vortex rings. Note that no intentional vorticity is shed into the fluid during a nominal operating condition, in which the magnitude of the vorticity is constant in time and uniform along the circumference of the vortex ring. Similarly, the intentional effect of a fuselage on the fluid flow can also be modelled as a three-dimensional continuous distribution of vorticity contained within the fuselage or located on the surface of the fuselage, i.e. the interface between the fuselage and the fluid.

The "induced power" of an IMSA is the rate of change of energy of the fluid that is associated with the intentional rate of change of momentum of the fluid. Any other power consumption is accounted for in "zero-lift power", or "profile power". Note that the term "lift" also encompasses thrust in this context. Note that an IMCA does not consume any induced power. Any power losses associated with a pure IMCA are considered profile power losses. An IMSA is able to consume induced power, in which case intentional work is done by the fluid manipulation apparatus on the fluid. For example, a propeller of an aircraft or a ship, or the fixed wing of a conventional fixed wing aircraft, results in, or is associated with, an induced power consumption. An IMSA is also able to recover induced power, in which case work is done by the fluid on the fluid manipulation apparatus intentionally. For example, the power generated by a wind turbine can be considered to be induced power.

In the process of applying a rate of change of momentum to a fluid, a fluid manipulation apparatus can change the flow velocity relative to the local free stream velocity. This change in velocity is the "downwash", or "induced velocity". Note that the induced velocity can be directed downstream or upstream, or perpendicularly to the stream, for example. An induced velocity can be generated by an IMSA or an IMCA. In the latter case, the induced velocity is localized, i.e. confined to the vicinity of the IMCA. In these terms, an IMSA can also be characterized as an apparatus, which contributes an intentional induced velocity to the far wake in an isolated scenario. Note that an induced velocity contribution by one IMSA can be cancelled by another IMSA when both are IMSAs are considered together.

In the following paragraphs, and in the context of FIGS. 1-2, several apparatuses and methods used in the prior art will be discussed.

FIG. 1 is a cross-sectional view of a prior art TA. It shows a propeller 1, where the thrust of propeller 1 is directed towards the top of the figure, as indicated by thrust vector 39. In the depicted operating condition, there is a non-zero free stream flow flowing from the top of the figure to the bottom, as indicated by arrow 40.

The dotted line schematically indicates the approximate boundary 2 between the free stream flow and the flow flowing through the rotor disc. A line that lies on the boundary can be described a streamline, and the volume enclosed by the boundary can be described as a streamtube. Note that the boundaries shown in the figures are only examples for a certain operating condition. The shape of the boundaries can be very different for other operating conditions or modes of operation of the depicted TAs, such as hover or energy extraction from free stream flow such as wind or water currents. In the free stream far ahead of the propeller the flow is approximately equivalent to the free stream flow.

This state of the fluid is indicated by station 3 in FIG. 1. The properties of the fluid at the propeller are encapsulated by station 4. The flow in the far wake, or the free stream far downstream of the propeller, is referred to by station 5. Since the propeller accelerates the flow, the area of the streamtube decreases from station 3 to station 4 and from station 4 to station 5.

At station 5 the flow has a larger velocity magnitude than the free stream flow, such as the flow found at station 3, while the pressure of the flow inside the streamtube can be assumed to have returned to the free stream pressure in the framework of conventional simple momentum theory. The larger velocity at station 5 is indicative of an increase in momentum of the fluid as a result of the propeller accelerating the flow and experiencing an equal and opposite force or thrust. The higher velocity also results in a larger kinetic energy in the fluid, which, in the aforementioned framework, is indicative of the power required to provide the thrust.

Note that simple momentum theory is only used as a framework to describe the basic principles of lift using a TA, and the assumptions conventionally contained within this theory are not intended to apply to embodiments or limit scope. For example, the distribution of downwash need in general not be constant across the cross-section of the streamtube. Note that the plotted radii of the streamtube at each station are approximate, and only intended to indicate the general shape of the streamtube.

The cross-sectional view of the propeller shows a first propeller blade 6 and a second propeller blade 7. The trailing edge 9 of the first propeller blade 6 and the leading edge 10 of the second propeller blade 7 are also visible. In all figures containing propellers a similar configuration is shown.

Figure 2:
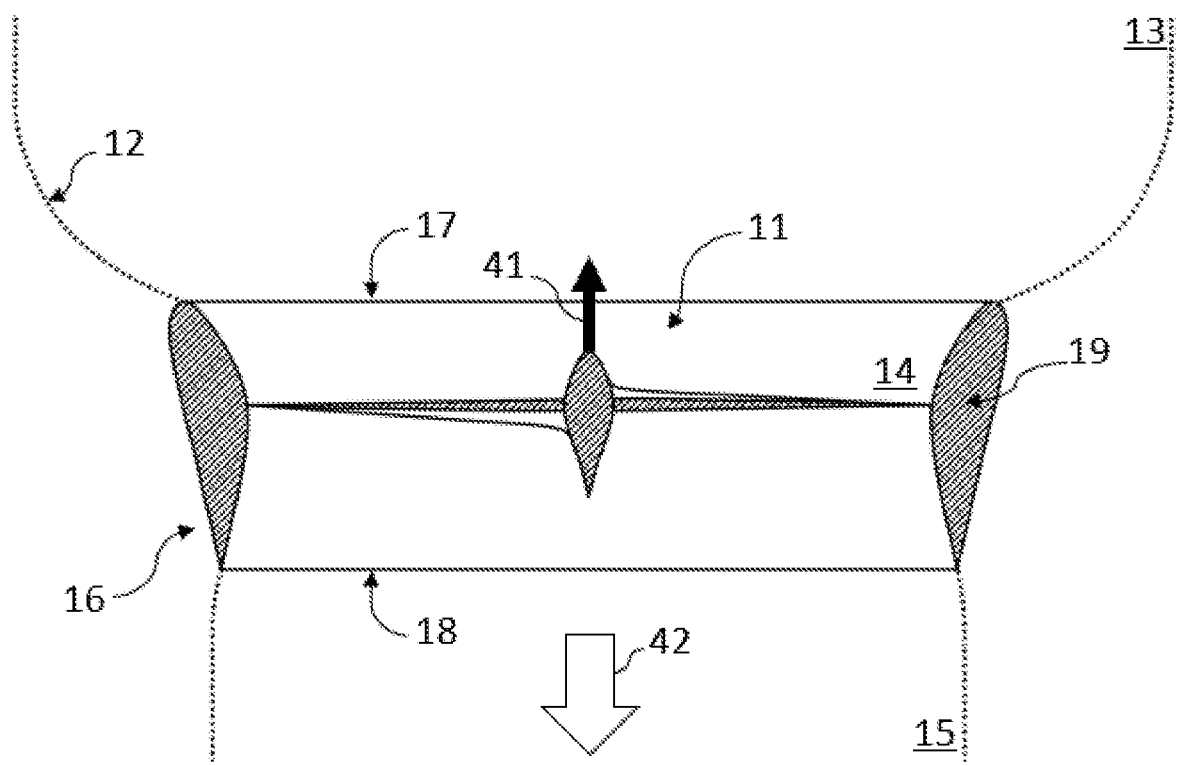

FIG. 2 is a cross-sectional view of another prior art TA. It shows a ducted propeller, where the thrust of propeller 11 is directed towards the top of the figure, as indicated by thrust vector 41. In the depicted operating condition, there is a non-zero free stream flow flowing from the top of the figure to the bottom, as indicated arrow 42. There is an additional thrust produced by duct 16, with leading edge 17 and a trailing edge 18, and a cross-section 19. Similarly to FIG. 1, there is a streamtube boundary 12, with a far upstream station 13, a station 14 at the rotor, and a far wake station 15. The duct 16 encloses the propeller 11 circumferentially.

In accordance with some embodiments, an apparatus and method is provided which can modify the flow more effectively than methods employed in the prior art. The modification can refer to, but is not limited to, the flow velocity at a specified location(s) in the flow, and can apply to, but is not limited to, the generation of thrust.

The method comprises providing a thrust apparatus assembly with an upstream thrust apparatus configured to produce an intended force, or thrust, in a first direction relative to the free stream flow during nominal operation, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to produce a thrust with at least a vector component parallel to the direction of the induced velocity vector of the upstream thrust apparatus at the location of the downstream thrust apparatus in the streamtube of the upstream thrust apparatus, where the thrust of the downstream thrust apparatus meets this direction criterion over at least a portion of the area of overlap between the streamtube of the upstream thrust apparatus and the streamtube of the downstream thrust apparatus. A thrust apparatus assembly can include at least 2 thrust apparatuses.

Note that the streamtube can be curved by external lifting apparatuses or thrust apparatuses. In some instances, the induced velocity vector of the upstream thrust apparatus at the location of the downstream thrust apparatus need no longer be aligned with the thrust experienced by the upstream thrust apparatus. In some instances, it can also be no longer aligned with the induced velocity vector of the upstream thrust apparatus at the location of the upstream thrust apparatus. The induced velocity vector of the downstream thrust apparatus at the location of the downstream thrust apparatus is configured to have at least a component in a direction opposite the induced velocity vector of the upstream thrust apparatus at that location. The thrust experienced by the downstream thrust apparatus therefore does not have to have a component in the opposite direction of the thrust of the upstream thrust apparatus.

Alternatively, the method comprises providing a thrust apparatus assembly with an upstream thrust apparatus configured to impart a first rate of change of momentum in at least an intended direction relative to the free stream flow velocity vector, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to impart a second rate of change of momentum on the fluid in the streamtube of the upstream thrust apparatus, where the direction of this second rate of change of momentum has at least a component in the opposite direction of the effect of the first rate of change of momentum on the fluid in the streamtube of the upstream thrust apparatus for at least a portion of the area of overlap between the streamtube of the upstream thrust apparatus and the streamtube of the downstream thrust apparatus.

Alternatively, the method comprises providing a thrust apparatus assembly with an upstream thrust apparatus configured to deliver an intended amount of induced power to a fluid, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to extract an intended amount of induced power from the fluid over at least a portion of the area of overlap between the streamtube of the upstream thrust apparatus and the streamtube of the downstream thrust apparatus.

Alternatively, the method comprises providing a thrust apparatus assembly with an upstream thrust apparatus configured to extract an intended amount of induced power from a fluid, and further providing the thrust apparatus assembly with at least a downstream thrust apparatus, where the downstream thrust apparatus is placed at least partially in at least a portion of the downstream streamtube of the upstream thrust apparatus, and where the downstream thrust apparatus is configured to deliver an intended amount of induced power to the fluid over at least a portion of the area of overlap between the streamtube of the upstream thrust apparatus and the streamtube of the downstream thrust apparatus.

One of the benefits of such a thrust apparatus assembly is the modification of the flow speed at specified points within the streamtube. For example, at a station between the upstream and downstream thrust apparatuses, the flow speed can be artificially increased. In the ideal case, any work done by the upstream thrust apparatus can be recovered by the downstream thrust apparatus, resulting in minimal energy losses in the process. Furthermore, any undesired change of momentum imparted to the fluid by an upstream thrust apparatus can be removed by a downstream thrust apparatus. In other words, any undesired thrust experienced by the upstream thrust apparatus can be cancelled by the downstream thrust apparatus. Some embodiments thus provide a method for flow modification, where the method can be more effective than methods employed in the prior art.

Figure 3:
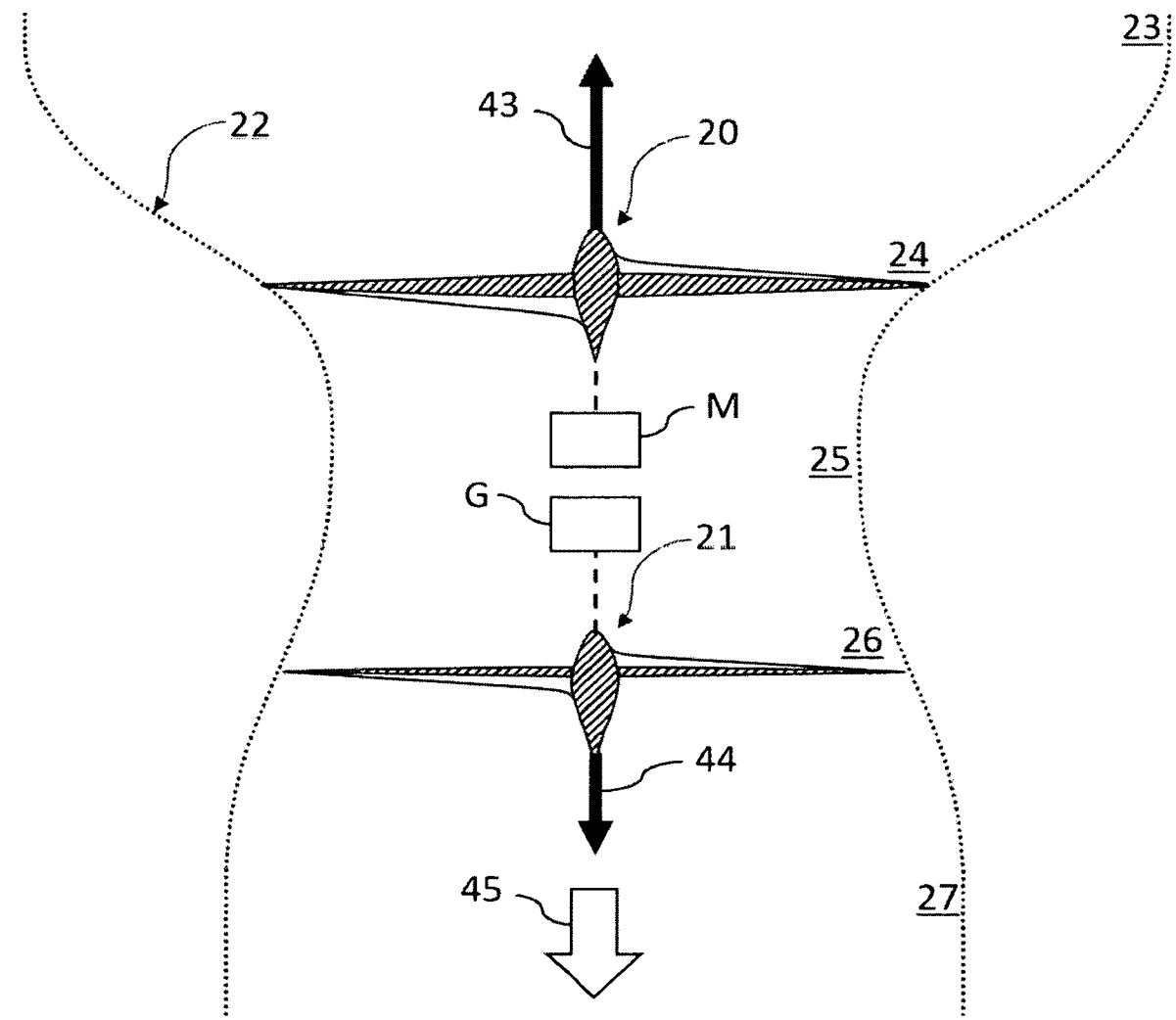
FIG. 3 is a cross-sectional view of an intentional fluid manipulation apparatus ("IFMA") configuration, according to some embodiments.

There are a multitude of possible embodiments of apparatuses employing the method outlined above. One embodiment is shown in FIG. 3. The figure shows a thrust apparatus assembly comprising an upstream thrust apparatus 20, which can be classified as a propeller, and a downstream thrust apparatus 21, which can also be described as a propeller in this case. In other embodiments, the thrust apparatus 20 or 21 can be of a type other than an open rotor type depicted. For example, a thrust apparatus can comprise several open rotors, or it can comprise at least one ducted fan, or a pair of coaxial counter-rotating propellers. Similarly to FIG. 1, there is a streamtube boundary 22, with a far upstream station 23, a station 24 at the upstream thrust apparatus 20, a station 25 between the upstream 20 and downstream thrust apparatus 21, a station 26 at the downstream thrust apparatus 21, and a far wake station 27. The downstream thrust apparatus 21 is placed in the streamtube 22 of the upstream thrust apparatus 20 in this case.

In this example, the thrust apparatus assembly is required to provide a net thrust, which is directed vertically upwards, towards the top of the figure. There is a free stream flow from the top of the figure towards the bottom, as indicated by arrow 45. The purpose of the embodiment in this example is to reduce the induced power of the thrust apparatus assembly for a given amount of thrust compared to a baseline configuration. The baseline configuration in this case is a single open rotor such as the open rotor example illustrated in FIG. 1, where the net thrust and actuator disc area at station 4 and 24 are identical.

In accordance with some embodiments, this is accomplished by the IFMA configuration shown in FIG. 3 as follows. The upstream thrust apparatus 20 is configured to provide a thrust which is parallel to and larger than the net thrust required of the thrust apparatus assembly, where the net thrust is the thrust of the upstream thrust apparatus 20 added to the thrust of the downstream thrust apparatus 21. The net thrust on the thrust apparatus assembly needs to equal the required thrust. Accordingly, the thrust on the downstream thrust apparatus 21 is equal to the difference in the net thrust and the thrust of the upstream thrust apparatus 20. In this case, this results in a thrust on the downstream thrust apparatus 21, which is directed vertically downwards, towards the bottom of the figure, as indicated by thrust vector 44, pointing in the opposite direction of the thrust vector 43 on the upstream thrust apparatus 20. In other words, the downstream thrust apparatus 21 is configured to extract any momentum imparted to the fluid by the upstream thrust apparatus which would violate, and in this case exceed, the net required thrust constraint on the thrust apparatus assembly. The downstream thrust apparatus 21 is furthermore configured to extract power from the fluid. In order to improve the induced power consumption compared to the baseline, a sufficient portion or all of the extracted induced energy needs to be recovered reversibly or directly transmitted to the upstream thrust apparatus 20.

Energy can be recovered reversibly by storing it reversibly within the thrust apparatus assembly, or transferring it reversibly to another apparatus interfacing with the thrust apparatus assembly. For example, the downstream thrust apparatus can drive a generator G, which can comprise an electric motor configured to convert a portion of the mechanical energy into electrical energy. A portion the electrical energy can be stored reversibly in a battery, capacitor or other energy storage device. The battery can be located within the thrust apparatus assembly, or on an external apparatus attached to the thrust apparatus assembly, such as the remainder of a vehicle. The energy can also be extracted and stored mechanically in the form of a flywheel.

Energy can be directly transmitted to the upstream thrust apparatus 20 in several ways. For example, if the energy is extracted from the downstream thrust apparatus 21 by an electric generator G, the electrical energy can be transmitted to an electric motor M driving the upstream thrust apparatus 20 via electrical conductors, or wires. Alternatively, the power extracted by the downstream thrust apparatus can be transmitted mechanically in the form of a drive shaft rigidly connecting the upstream 20 and downstream thrust apparatus 21. In some embodiments, the mechanical energy transmission apparatus need not form a rigid connection, but comprise adjustable linkages, gears and other mechanisms, such as clutches.

There are a multitude of other methods known in the art for recovering mechanical energy from the downstream thrust apparatus 21, and storing it, or transmitting it to the upstream thrust apparatus 20.

The above embodiment results in an induced power which is less than the baseline induced power. For a given maximum actuator disc area at station 4 and 24, and a given net thrust, the induced power decreases as the thrust of the upstream thrust apparatus 20 increases. Note that the thrust of the upstream thrust apparatus 20 needs to be larger than the net required thrust in order to achieve a reduction in induced power compared to be baseline in this example.

Some embodiments provide an improvement on a ducted thrust apparatus as exemplified by FIG. 2. The duct has several advantages, such as a reduction in the tip losses of the propeller, which allow it to operate at a lower induced power for the same amount of thrust compared to an open rotor. A duct also has several disadvantages. It can increase the weight of the TA as well as the wetted area and the associated drag. The effectiveness of a duct is furthermore limited by the risk of flow separation in the diffusor. In addition, changing the shape of a duct to achieve efficiency gains at different flow speeds often impractical due to complexity and weight.

Some embodiments are less affected by some of these disadvantages. For some ductless embodiments, a thrust apparatus can experience benefits of a duct without an equivalent penalty in weight and wetted area. In order to avoid flow separation, ducts would require a large diffusor, which can be impractical due to weight and size constraints. Ductless embodiments are less sensitive to stall constraints, which would allow some embodiments to achieve greater performance than ducted rotors. The thrust apparatuses can also be reconfigured with less complexity than ducts. For example, a thrust apparatus of the open rotor type can be reconfigured by varying the collective pitch of the propeller blades, and the rotational speed can be readily controlled. This could allow a thrust apparatus to operate more efficiently with less complexity at different operating conditions, such as hover or level cruise.

Note that in FIG. 3 the upstream thrust apparatus 20 provided the required thrust of the particular thrust apparatus assembly as well as additional thrust that is cancelled by the downstream thrust apparatus 21. In some embodiments, it can be desirable to physically separate the thrust apparatuses that cancel each other in their contribution to the net thrust of a thrust apparatus assembly from the remainder of the thrust apparatus assembly.

Figure 4:
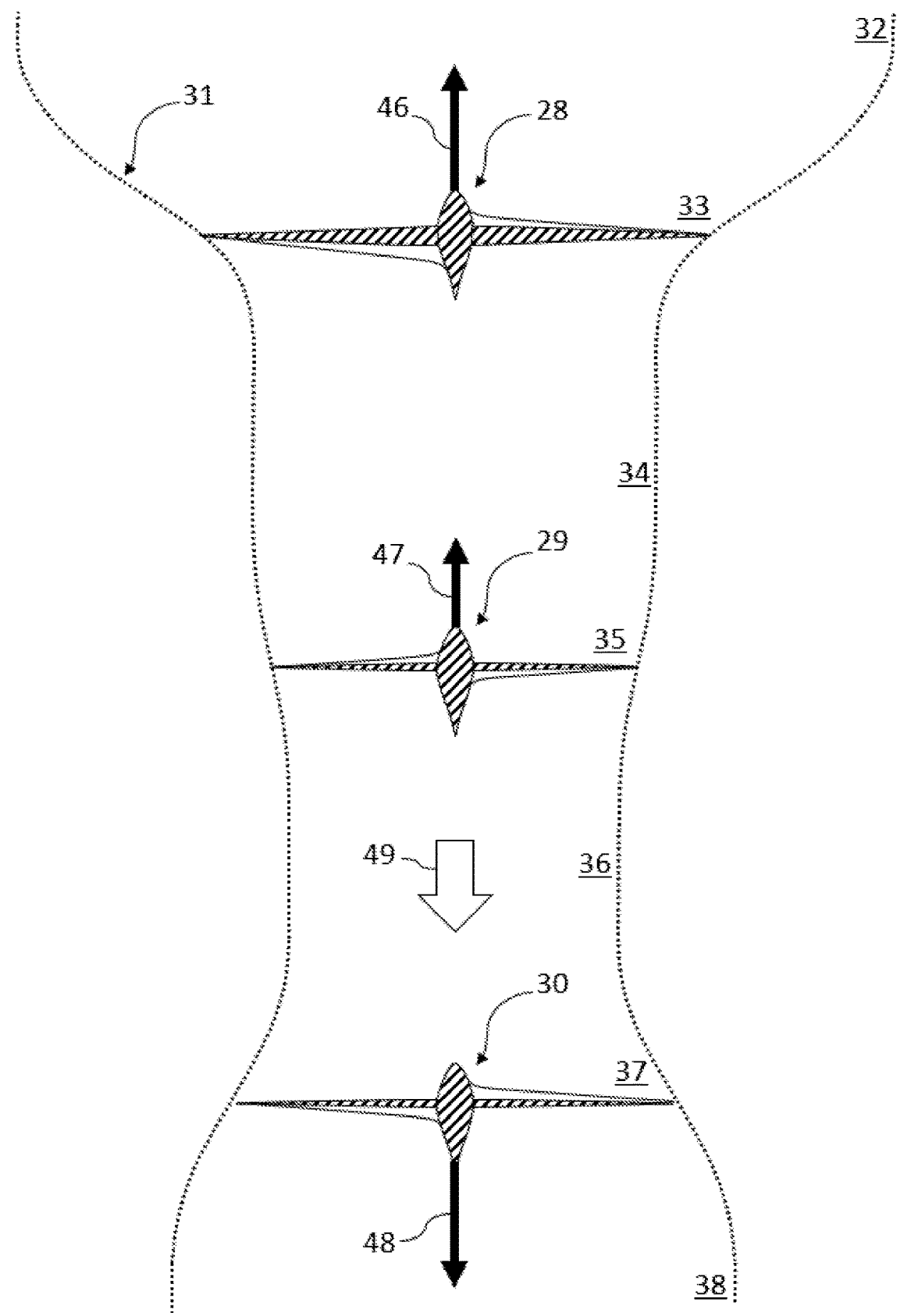
FIG. 4 is a cross-sectional view of an IFMA configuration, according to some embodiments.

FIG. 4 illustrates such a scenario. The figure shows an auxiliary thrust apparatus assembly comprising an upstream thrust apparatus 28, which can be classified as a propeller, and a downstream thrust apparatus 30, which can also be described as a propeller in this case. The figure also shows a middle thrust apparatus 29, which is also of the open rotor type. There is a free stream flow directed vertically downwards from the top of the figure towards the bottom, as indicated by arrow 49. Similarly to FIG. 1, there is a streamtube boundary 31, with a far upstream station 32, a station 33 at the upstream thrust apparatus 28, a station 34 between the upstream 28 and middle thrust apparatus 29, a station 35 at the middle thrust apparatus 29, a station 36 between the middle 29 and downstream thrust apparatus 30, a station 37 at the downstream thrust apparatus 30, and a far wake station 38. The middle thrust apparatus 29 and downstream thrust apparatus 30 are placed in the streamtube 31 of the upstream thrust apparatus 28 in this case.

In this example, middle thrust apparatus 29 provides a thrust equal to the required net thrust of the total thrust apparatus assembly, as indicated by thrust vector 47, where the thrust apparatus assembly comprises the upstream 28, middle 29 and downstream 30 thrust apparatuses. Therefore, the auxiliary thrust apparatus assembly is required to provide no net thrust. As in FIG. 3, the purpose of the embodiment in this example is to reduce the induced power of the total thrust apparatus assembly for a given amount of thrust compared to a baseline configuration. The baseline configuration in this case is also a single open rotor such as the open rotor example illustrated in FIG. 1, where the net thrust and actuator disc area at station 4 and station 33 are identical.

In accordance with some embodiments, this is accomplished by the embodiment shown in FIG. 4 as follows. The upstream thrust apparatus 28 is configured to provide a thrust which is parallel to and larger than the net thrust required of the total thrust apparatus assembly, where the net thrust is the thrust of the upstream thrust apparatus 28, added to the thrust of the middle thrust apparatus 29, added to the downstream thrust apparatus 30. The thrust of the upstream thrust apparatus 28 is thus directed in towards the top of the page, as indicated by thrust vector 46. The thrust on the downstream thrust apparatus 30 is in this case equal and opposite to the thrust of the upstream apparatus 28, as indicated by thrust vector 48. In other words, the downstream thrust apparatus 30 is configured to extract any momentum imparted to the fluid by the upstream thrust apparatus which would violate, and in this case exceed, the net required thrust constraint on the total thrust apparatus assembly. The downstream thrust apparatus 30 is furthermore configured to extract power from the fluid, in a manner described previously in regards to the downstream thrust apparatus 21 in FIG. 3.

Note that the upstream and downstream thrust apparatus do not have to individually operate at minimum induced power as long as the overall induced power is minimized, should that be the objective. For example, if the objective is to maintain a constant downwash across the cross-section of the far stream streamtube at station 38, the downwash of the upstream thrust apparatus 28 or the middle thrust apparatus 29 does not have to be uniform, as long as any non-uniformity is removed by the downstream thrust apparatus.

Note that principles that apply to coaxial propellers also apply to some embodiments. For example, the actuator disc area at station 35 of the middle thrust apparatus 29 can be as large as the actuator disc area of the upstream thrust apparatus 28 at station 33. A portion of the middle thrust apparatus is thus interfacing with the free stream flow. The middle thrust apparatus can use this area to further impart a rate of change of momentum to the fluid in the direction of the required thrust of the total thrust apparatus assembly. This could allow the thrust apparatus assembly to further reduce the induced power compared to the baseline. Similarly, one can also increase the actuator disc area of the downstream thrust apparatus, such as 30 in FIG. 4 or 21 in FIG. 3. The concept of interacting with bypass fluid flow is well known in the art. Furthermore, as is known in the prior art, the direction of rotation of the propellers in the streamtube can be chosen such that the swirl in the far wake is minimized.

In the following paragraphs, other embodiments will be described.

For generality it is instructive to consider the embodiments in isolation. In one embodiment, the purpose of an apparatus is to increase the local flow velocity relative to the free stream flow at a specified point in the flow. This can be achieved by a thrust apparatus assembly with an upstream thrust apparatus configured to impart a rate of change of momentum downstream, resulting in a downstream induced flow velocity vector. The upstream thrust apparatus is located upstream of the specified point in the flow, and experiences a thrust in the upstream direction, and doing work on the fluid, resulting in an induced power consumption. The thrust apparatus assembly can further comprise a downstream thrust apparatus, which is configured to impart a rate of change of momentum upstream, resulting in an upstream induced flow velocity vector. The downstream apparatus is located in the streamtube of the upstream thrust apparatus. The downstream thrust apparatus is located downstream of the specified point in the flow, and experiences a thrust in the downstream direction, and is recovering power from the fluid. In the ideal case, all the induced power imparted by the upstream apparatus to the fluid is recovered by the downstream apparatus, such that no net induced power is lost to the fluid. The thrust on the upstream and downstream thrust apparatuses furthermore cancel, in this idealized case with a requirement of zero net thrust of the thrust apparatus assembly. As long as the upstream and downstream thrust apparatus assemblies are located far enough apart to allow for flow acceleration, the specified point located between the upstream and downstream thrust apparatuses can experience the desired increase in local flow velocity. This is due to the induced flow, or the downwash of the upstream thrust apparatus as well as the downwash, of the downstream thrust apparatus. This downwash can subsequently be recovered further downstream of the specified point by the downstream thrust apparatus, such that in the ideal case no downwash is present in the far wake of the streamtube.

In another embodiment, the purpose of an apparatus is to decrease the local flow velocity at a specified point in the flow. In accordance with some embodiments, this can be achieved by reversing the roles of the upstream and downstream thrust apparatuses compared to the above example. Thus the upstream thrust apparatus can be configured to impart a rate of change of momentum upstream, resulting in an upstream induced flow velocity vector. Similarly, the downstream thrust apparatus can be configured to impart a rate of change of momentum downstream, resulting in a downstream induced flow velocity vector. In the ideal case, all the induced power recovered by the upstream apparatus is expended by the downstream apparatus, such that no net induced power is extracted from the fluid by the thrust apparatus.

Note that the upstream thrust apparatus needs to meet the local flow velocity requirement only at the specified point. Different points in the streamtube containing the actuator disc area of the upstream thrust apparatus can require different increases or decreases in local flow velocities compared to the free stream flow. The local flow velocity requirements can be treated as requirements on the downwash of the thrust apparatus assembly at the specified points or collections of points in a streamtube, or in proximity of a streamtube. These requirements can be met by varying the thrust distribution across the actuator disc area of the upstream and downstream thrust apparatuses. Given these flow constraints at the specified points, there might be an additional objective, such as the minimization of induced power, which can be translated to an additional requirement of either zero or uniform downwash in the far wake. The objective can also be the minimization of total power consumed at this operating condition.

Consider an operating condition for a thrust apparatus assembly, for which the purpose is to maximize the power extracted from a fluid for a given maximum actuator disc area and free stream flow speed, assuming structural constraints are always satisfied. One can consider a baseline configuration consisting of an open rotor, such as a wind turbine. In accordance with some embodiments, a thrust apparatus assembly could comprise an upstream and a downstream thrust apparatus. The downstream thrust apparatus is placed in the slipstream of the upstream thrust apparatus, in this example. There is a non-zero free stream flow. The upstream thrust apparatus is configured to do work on the free stream flow by imparting a rate of change of momentum on the flow in a downstream direction. Through interaction with the fluid the upstream thrust apparatus is thus experiencing a force which is directed upstream. The downstream thrust apparatus is configured to extract power from the flow in the streamtube of the upstream thrust apparatus. In other words, the fluid is doing work on the downstream thrust apparatus, and experiencing a rate of change of momentum directed upstream, such that the downstream thrust apparatus is experiencing a force in the downstream direction. Thus a performance improvement can be achieved compared to the baseline open rotor configuration. For example, a wind turbine can comprise two open rotors, where one is located upstream of the mast, and the other is located downstream. The rotors can be operated as described above. The power consumed by the upstream rotor can be provided by an external power source, or by the downstream rotor. As mentioned in the description of FIG. 3, the power can be transmitted between the upstream and downstream thrust apparatus mechanically via a direct connection with a shaft, or via an adjustable transmission comprising a gear train and clutch, for example. The power can also be transmitted electrically, where the downstream rotor is driving an electric generator, the electric energy of which is transferred to an electric motor driving the upstream rotor. Note that other configurations are also possible, and that the principles also apply to a water turbine or other thrust apparatus or operating condition In some embodiments or operating conditions, it can be desirable to reduce the local flow speed at the actuator disc of the downstream rotor rather than increase it. For example, in the case of the wind turbine, for some operating conditions, the free stream flow velocity may exceed the allowed peak free stream flow velocity of the downstream rotor. Note that the peak free stream flow velocity for the upstream rotor, as determined by structural limits, for instance, can be larger than the peak free stream flow velocity of the downstream rotor due to their different sizes and nominal operating loads. They can also be different by design. In this case, the thrust on the upstream rotor could be reversed, such that it extracts power from the flow and reduces the flow speed at the downstream rotor to nominal levels. In this way the thrust on the downstream rotor can be prevented from exceeding design limits. Thus the upstream thrust apparatus can be used to modify the flow field such that the performance of the entire thrust apparatus assembly is optimized. Note that there are other methods known in the art which are applicable to such a scenario. In the case of a single open rotor, the operating conditions such as rate of rotation and propeller pitch can be adjusted. The effectiveness of these methods is limited to a range of free stream velocities, however, and some embodiments can expand these limits. The principles described in this context are also applicable to other operating conditions and scenarios.

In the following paragraphs, and in the context of FIG. 5, some apparatuses and methods used in the prior art will be discussed.

A "boundary apparatus" comprises any incremental surfaces or volumes of a fluid manipulation apparatus which directly apply forces or moments to fluid elements, or vice versa. Examples of a boundary apparatus are the wetted surface of a fuselage of an aircraft, or the wetted surface of the hull of a ship, the skin of a wing, the surface of a flat plate, or the outside surface of a car.

Figure 5:
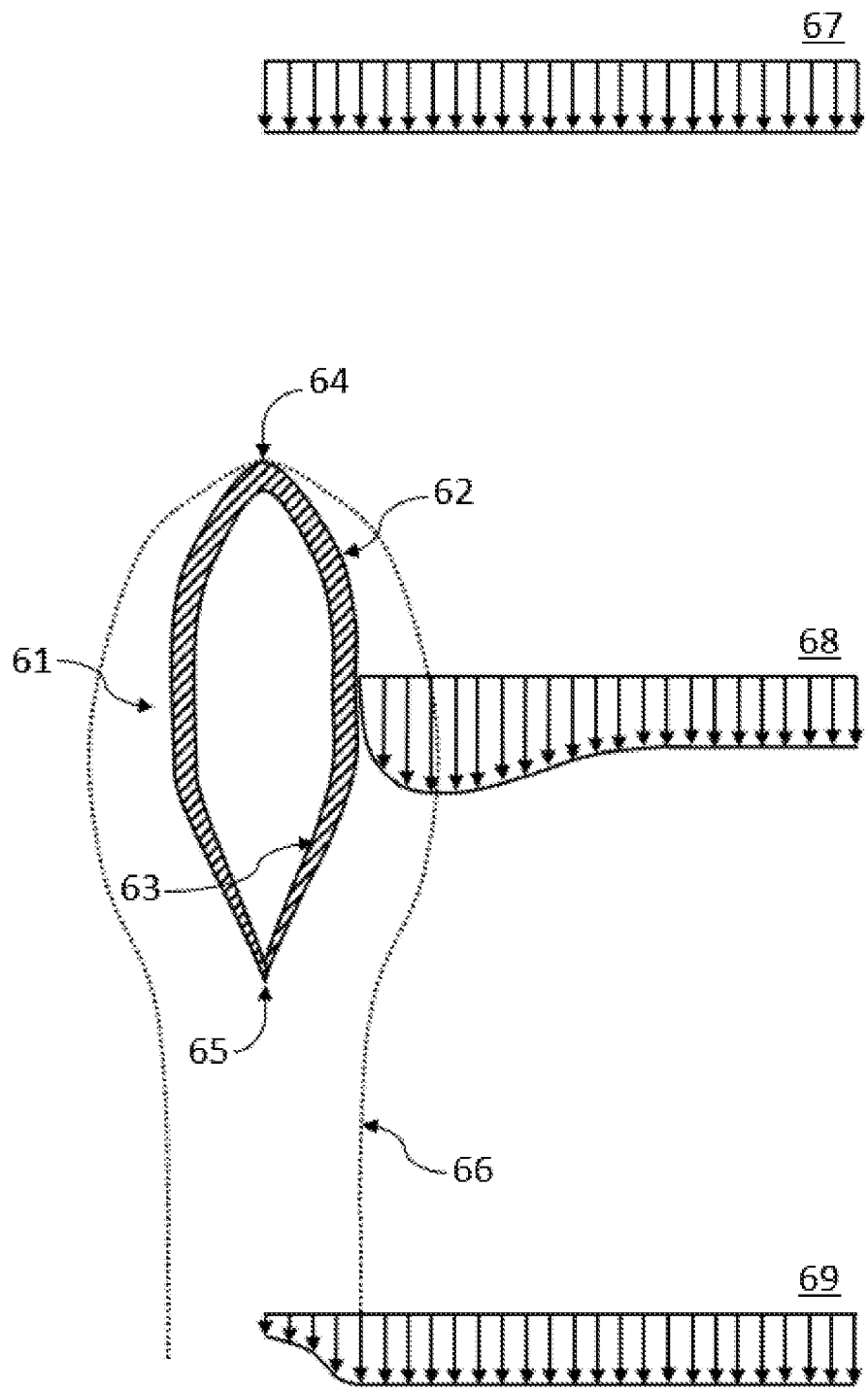
FIG. 5 is a cross-sectional view of a prior art fluid manipulation apparatus.

FIG. 5 shows a cross-sectional view of a boundary apparatus 61 moving relative to a surrounding fluid. Boundary apparatus 61 has a leading point 64, and a trailing point 65. The leading and trailing point can also be an edge, such as the leading edge or trailing edge of a wing. In this particular embodiment, for simplicity, the boundary apparatus is a rigid body which can be described as a thin shell, with a closed outside surface 62 and inside surface 63. In this embodiment, the shape of boundary apparatus 61 is a revolute shape, i.e. it is axially symmetric about an axis passing through the leading point 64 and trailing point 65.

One can define a "boundary apparatus frame", or "BAF", as follows. The origin is located at the geometric centroid of the volume enclosed by outside surface 62 of boundary apparatus 61. The x-axis is coincident with the straight line connecting the leading point 64 with the trailing point 65, and directed towards the leading point 64. Unless specified, the z-axis is pointing perpendicularly into the page of the figure.

Three velocity profiles 67-69 are shown. Each arrow in a velocity profile indicates the velocity vector of an incremental fluid element relative to the boundary apparatus, where the incremental fluid element is located at the base of the arrow. The line connecting the tips of the arrows in velocity profile 67 describes the continuous velocity distribution.

Boundary apparatus 61 is moving relative to the surrounding fluid. The free stream flow velocity is uniform in space and constant in time. In FIG. 5 the free stream fluid flow relative to boundary apparatus 61 is directed parallel to and in the opposite direction of the x-axis of the BAF, i.e. from the top of the figure towards the bottom. Far upstream of boundary apparatus 61 the velocity of incremental fluid elements is approximately equal to the free stream flow velocity. Thus the velocity profile 67 is uniform, with magnitude and direction equal to the free stream flow velocity.

Velocity profile 68 describes the velocity distribution in the proximity of boundary apparatus 61. In this embodiment, there is a no-slip condition on the surface of boundary apparatus 61. In other embodiments, there can be a non-zero slip velocity along the outside surface 62. Due to viscous effects, the resulting velocity gradient in the direction of the y-axis of the BAF gives rise to a shear stress acting on boundary apparatus 61, which in turn gives rise to viscous drag force. The viscous drag force is parallel to the x-axis of the BAF, and directed in the negative x-direction.

Streamline 66 describes the approximate thickness of the boundary layer associated with boundary apparatus 61. Since boundary apparatus 61 is cylindrically symmetric, streamline 66 can also be referred to as a streamtube 66.

Velocity profile 69 describes the velocity distribution in the far wake of boundary apparatus 61. The reduced velocity magnitude inside streamtube 66 in velocity profile 69 illustrates the momentum deficit in the far wake which is caused by the viscous drag force acting on boundary apparatus 61.

In accordance with some embodiments, the flow field surrounding a boundary apparatus is modified by a fluid flow manipulation apparatus in a manner in which the viscous drag on the combined apparatus is lower than a baseline boundary apparatus for at least one operating condition.

The baseline boundary apparatus need not have the same shape as the boundary apparatus in the combined apparatus. The baseline boundary apparatus is a conventional apparatus used in the prior art, such as boundary apparatus 61 depicted in FIG. 5. For example, the baseline boundary apparatus can have the shape of a conventional tubular aircraft fuselage.

The slip velocity is the velocity of the fluid at, and relative to, the surface of the boundary apparatus. In a viscid fluid, the slip velocity is typically smaller in magnitude compared to the slip velocity calculated for a theoretical scenario in which the fluid is inviscid. The difference between these two velocities is referred to as the "velocity deficit". Due to viscous effects the velocity deficit at the surface of the boundary apparatus propagates through the fluid in a direction perpendicular to the local free stream flow velocity. As a result, a non-negligible volume of the fluid is affected by the velocity deficit. The region of fluid flow which is affected by this velocity deficit is referred to as the boundary layer. The thickness of this region is called the boundary layer thickness. The boundary layer thickness can be defined as the region within which the velocity deficit is larger than 1% of the magnitude of the velocity calculated for a theoretical scenario in which the fluid is inviscid, ceteris paribus. The velocity deficit translates into a momentum deficit, which gives rise to a viscous shear stress and viscous drag acting on the boundary apparatus.

In accordance with some embodiments, the local free stream flow velocity is reduced for at least a portion of the wetted area of the combined apparatus compared to the case in which the effect of the fluid flow manipulation apparatus on the fluid flow is mathematically eliminated. The fluid flow manipulation apparatus is configured in such a way, that the increase in power consumption of the combined apparatus due to the additional wetted area of the fluid flow manipulation apparatus compared to the baseline boundary apparatus is smaller in magnitude than the reduction in the power consumed by the boundary apparatus due to the drag force acting on the boundary apparatus compared to the baseline boundary apparatus. A portion of the reduction in power consumed by the boundary apparatus can arise from a reduction in the local free stream flow velocity of the boundary apparatus. Alternatively or concurrently, the fluid manipulation apparatus can be configured to favor laminar flow as opposed to turbulent flow in at least a portion of the boundary layer of the boundary apparatus. Another portion of the reduction in power consumed can arise from a change in shape of the boundary apparatus compared to the baseline boundary apparatus. The fluid flow manipulation apparatus can manipulate the flow in such a way that the wetted area of the boundary apparatus can be reduced without leading to increased pressure drag due to separation of a portion of the flow. For a given volume that is to be enclosed by a boundary apparatus, the shape of the boundary apparatus with the smallest wetted area is a sphere. A sphere, however, would induce a large pressure drag due to stalled flow downstream of the sphere. Even without stall, a sphere would also induce a larger viscous drag due to a larger mean square local free stream flow velocity over the wetted area, as well as boundary layer effects. For these reasons, amongst other reasons such as ease of manufacture most fuselages have an elongated shape similar to that of a tube or tear drop. A fluid manipulation apparatus could modify the flow such that the wetted area of the boundary apparatus can be reduced while also reducing the mean square local free stream flow velocity compared to the baseline boundary apparatus.

The flow field modification can take several forms, and each form of modification can be carried out by several different embodiments of fluid manipulation apparatuses.

Figure 7:
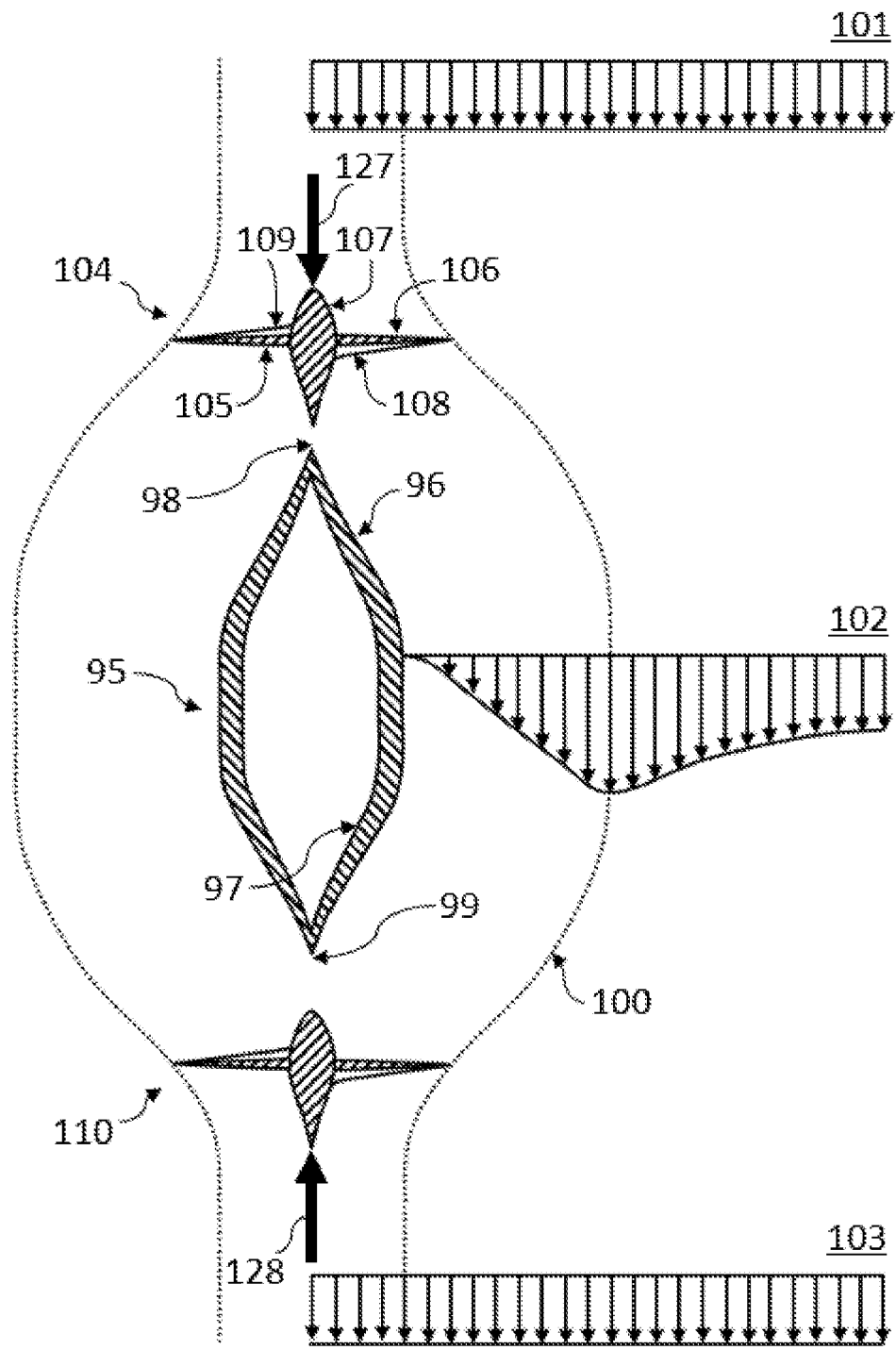
FIG. 7 is a cross-sectional view of an IFMA configuration, according to some embodiments.

FIG. 7 depicts an IFMA configuration including a boundary apparatus 95 moving relative to a surrounding fluid. Boundary apparatus 95 has a leading point 98, and a trailing point 99. The leading and trailing point can also be an edge, such as the leading edge or trailing edge of a wing or an airfoil. In the case of a wing, the leading edge and the trailing edge can be considered to be the leading and trailing stagnation lines for a specified flow condition. In this embodiment, the boundary apparatus is a rigid body which can be described as a thin shell, with a closed outside surface 96 and inside surface 97. In this embodiment, the shape of boundary apparatus 95 is a revolute shape, i.e. it is axially symmetric about an axis passing through the leading point 98 and trailing point 99.

Boundary apparatus 95 can be the hull of a ship, or the fuselage of an aircraft. In other embodiments, boundary apparatus 95 can have a different geometric shape. For instance, the shape of boundary apparatus can be similar to the shape of boundary apparatus 61 shown in FIG. 5. A suitable geometry can be found for any given application. A boundary apparatus can be manufactured using a variety of existing methods and materials.

One can define a "boundary apparatus frame", or "BAF", as follows. The origin is located at the geometric centroid of the volume enclosed by outside surface 96 of boundary apparatus 95. The x-axis is coincident with the straight line connecting the leading point 98 with the trailing point 99, and is directed towards the leading point 98. Unless specified, the z-axis is pointing perpendicularly into the page of the figure.

Three velocity profiles 101-103 are shown. Each arrow in a velocity profile indicates the velocity vector of an incremental fluid element relative to the boundary apparatus, where the incremental fluid element is located at the base of the arrow at the point in time in which the velocity it measured relative to the boundary apparatus. The line connecting the tips of the arrows in a velocity profile describes the continuous velocity distribution.

Boundary apparatus 95 is moving relative to the surrounding fluid. The free stream flow velocity is uniform in space and constant in time in the simplified scenario shown. In FIG. 7 the free stream fluid flow relative to boundary apparatus 95 is directed parallel to, and in the opposite direction of, the x-axis of the BAF, i.e. from the top of the figure towards the bottom. Far upstream of boundary apparatus 95 the velocity of incremental fluid elements is approximately equal to the free stream flow velocity. Thus, the velocity in velocity profile 101 is uniform in space and constant in time, with magnitude and direction equal to the free stream flow velocity relative to the boundary apparatus.

Velocity profile 102 describes the velocity distribution in the proximity of boundary apparatus 95. In this embodiment, there is a no-slip condition on outside surface 96 of boundary apparatus 95. In other embodiments, there can be a non-zero slip velocity along outside surface 96.

Streamline 100 describes the boundary of a streamtube, which has a circular cross-section when viewed along the x-direction. The dotted line in FIG. 7 schematically indicates the approximate boundary 100 between the free stream flow and the flow flowing through the rotor disc of upstream IMSA 104. A line that lies on the boundary can be described a streamline, and the volume enclosed by the boundary can be described as a streamtube. Note that the boundaries shown in FIG. 7 are only examples for a certain operating condition. The shape of the boundaries can be very different for other operating conditions or modes of operation of the depicted IMSAs.

Velocity profile 103 describes the velocity distribution in the far wake of boundary apparatus 95. In the simplified, ideal scenario the velocity profile 103 is substantially equal to the velocity profile 101, as shown in FIG. 7. In other embodiments, this need not be the case.

In accordance with some embodiments, a boundary apparatus, such as boundary apparatus 95 is provided with an intentional fluid manipulation apparatus. In the IFMA configuration shown in FIG. 7, this intentional fluid manipulation apparatus can be described as an IMSA assembly comprising an upstream IMSA 104, which can be classified as a propeller, and a downstream IMSA 110, which can also be described as a propeller in this case. The downstream IMSA 110 is placed in the streamtube 100 of the upstream IMSA 104 in this case. In other embodiments, this need not be the case. For example, downstream IMSA 110 can extend outside of streamtube 100 of the upstream IMSA 104 in other embodiments. Such a configuration can be useful in a scenario in which the downstream IMSA 110 is also being used to contribute positively to the net thrust of the IMSA assembly.

The cross-sectional view of the propeller, such as propeller 104, or upstream IMSA 104, shows a first propeller blade 105 and a second propeller blade 106. The leading edge 109 of the first propeller blade 105 and the trailing edge 108 of the second propeller blade 106 are also visible. In all figures containing propellers a similar configuration is shown. The propeller blades are structurally supported by rotor hub 107.

Downstream IMSA 110 is configured in a similar fashion as upstream IMSA 104, and will therefore not be described in the same detail. Upstream IMSA 104 and downstream IMSA 110 are rigidly connected to boundary apparatus 95 via a connection apparatus. This apparatus is not shown in FIG. 7 for clarity.

In other embodiments, IMSA 104 or 110 can be of a type other than the open rotor type depicted. For example, an IMSA can include several open rotors, or it can comprise at least one ducted fan, or a pair of coaxial counter-rotating propellers. An IMSA can also be a cyclogyro or a different type of IMSA.

In accordance with some embodiments, the flow field in the proximity of a boundary apparatus is intentionally modified, by a fluid manipulation apparatus in a manner in which the average spatial gradient of the flow velocity, in a direction normal to the surface of the boundary apparatus, is artificially and intentionally reduced. The shear stress is proportional to the gradient of the flow velocity for a Newtonian fluid. Thus, the viscous shear stress acting on the boundary apparatus is lower compared to embodiments of the prior art. In some embodiments, the reduction in the viscous power consumed by the boundary apparatus compared to a representative boundary apparatus of the prior art is larger than the added viscous power consumption of the intentional fluid manipulation apparatus. Thus, a net reduction in viscous power consumption can be achieved by some embodiments for a range of operating conditions. The optimal configuration of the intentional fluid manipulation apparatuses as well as the boundary apparatus depends on the application and constraints, and can be found using a wide variety of methods. For example, a number of such methods are known in computational fluid dynamics.

In the embodiment shown in FIG. 7, the aforementioned fluid manipulation apparatus consists of upstream IMSA 104 and downstream IMSA 110. This fluid manipulation apparatus is denoted the "IMSA assembly". The IMSA assembly reduces the average spatial gradient of the flow velocity at, and in a direction normal to, the surface of the boundary apparatus 95 by artificially and intentionally modifying the spatial distribution of the velocity of the flow in the proximity of the surface of the boundary apparatus 95.

In some embodiments, this modification comprises a reduction in the magnitude of the velocity of the flow at the outside surface 96 of boundary apparatus 95 in a full-slip scenario. A "full-slip scenario" is a theoretical scenario in which boundary layer effects, or the no-slip condition, are absent for a specified surface. In this theoretical scenario, the boundary layer effects or viscous drag effects of outside surface 96 on the fluid flow have been mathematically removed for a specified surface. The aforementioned reduction in velocity occurs relative to the local free stream fluid flow, i.e. the flow around boundary apparatus 95 in the absence of the IMSA assembly, which, in this case, is also calculated for a full-slip scenario. The scenario in which the IMSA assembly is assumed to have no effect on the fluid flow is denoted the "reference scenario". Note that the properties of a reference scenario are dictated by the scenario it is being compared to. For example, whether a particular reference scenario should be considered with a full-slip or no-slip condition should be clear from context. The reduction in velocity is a result of the combined induced velocity of the upstream IMSA 104 and the downstream IMSA 110 at the surface of the boundary apparatus 95 being directed in the positive x-direction of the BAF. This reduction in the magnitude of the velocity of the flow at the outside surface 96 of boundary apparatus 95 in a full-slip scenario can reduce the Reynolds number at outside surface 96 compared to the reference scenario. This reduction in the Reynolds number can, in a no-slip scenario, increase the thickness of the boundary layer and reduce the average spatial gradient of the flow velocity in a direction normal to outside surface 96 at outside surface 96. Thus, the average viscous shear stress and viscous drag losses of outside surface 96 can be reduced.

In some embodiments, the velocity at outside surface 96, although being reduced in magnitude, can still have a non-zero component in the negative x-direction in the full-slip scenario at outside surface 96. In other words, the general direction of the velocity of fluid elements at the outside surface 96 in a full-slip scenario can be largely unchanged compared to the aforementioned reference scenario with a full-slip condition.

In the depicted example, the magnitude of the fluid flow at the outside surface 96 of boundary apparatus 95 is has been artificially reduced to such an extent, that it is substantially zero in a full-slip scenario. When the magnitude of the fluid flow velocity at a given surface is zero in the full-slip scenario, a no-slip scenario would be equal to the full-slip scenario, ceteris paribus. In this scenario, the viscous drag on the outside surface 96 would be zero. Streamtube 100 can be considered to be an artificial boundary layer of boundary apparatus 95 in such an idealized, simplified scenario. Note that such a configuration may not be optimal, i.e. minimize the total viscous drag, when the viscous drag effects on the IMSA assembly are also considered.

As shown in velocity profile 102, the gradient of the magnitude of the fluid flow velocity in the direction normal to outside surface 96 is also substantially zero at the location shown. For some embodiments, this gradient can be greater than zero on average, where the average is calculated over the entire outside surface 96. This average gradient can nevertheless be smaller compared to the reference scenario with a no-slip condition.

In other embodiments, there can be different spatial variation or spatial distribution of the fluid flow within streamtube 100 in the proximity of the boundary apparatus 95. For example, there can be recirculation of flow. In other words, the fluid flow velocity adjacent to the outside surface 96 of boundary apparatus 95 can have a non-zero component in the positive x-direction in the full-slip scenario for all of, or portions of, outside surface 96. In this case, a trapped vortex ring, i.e. a ring of circulating flow, would surround all, or a portion, of boundary apparatus 95. Due to symmetry, this vortex ring would have a central axis aligned with, and coincident with, the x-direction of the BAF, and would lie in a plane parallel to the yz-plane of the BAF. Such a vortex ring would be held in place by the IMSA assembly, and re-energized by the surrounding flow.

In some embodiments, the spatial distribution of the flow velocity within streamtube 100 in the proximity of boundary apparatus 95 is also deliberately modified. In the embodiment shown in FIG. 7, the spatial distribution of the induced velocity is configured to generate a substantially linear variation of the magnitude of the fluid flow velocity within streamtube 100. As shown, the magnitude of the fluid flow velocity within streamtube 100 increases substantially linearly in the positive y-direction. In other embodiments, the magnitude of the flow velocity within streamtube 100 increases at an increasing rate in the positive y-direction. Such a configuration can help keep the Reynolds number of the boundary layer of outside surface 96 artificially low, even while the boundary layer thickness grows in the streamwise direction, i.e. the negative x-direction of the BAF. A gradual gradient in the velocity magnitude can also minimize frictional heating and turbulence effects within streamtube 100, and thus reduce drag losses or reduce the net power consumption associated with boundary apparatus 95. In the analogy in which streamtube 100 is considered to be the artificial boundary layer of boundary apparatus 95, a gradual gradient in the velocity magnitude can be desirable to ensure the artificial boundary layer is, and remains, substantially laminar. Furthermore, a gradual increase in the velocity magnitude within streamtube 100 would ensure that there is minimal transfer of momentum from the surrounding flow into streamtube 100, which would result in a momentum deficit in the flow surrounding streamtube 100 in the far wake, i.e. in velocity profile 103, and contribute to the viscous power consumption associated with boundary apparatus 95.

An optimal spatial variation of the magnitude of the fluid flow velocity within streamtube 100 can be found using existing methods, and need not be linear. For example, it can be desirable to reduce the rate of total vorticity shed by the upstream IMSA 104 into the fluid, amongst other criteria.

The optimal magnitude and direction of the fluid flow at the outside surface 96 in a full-slip scenario, as well as the magnitude and sign of the gradient of the flow velocity at the outside surface 96 can be optimized for a given flow condition or a given application using existing methods. The optimal distribution of fluid flow velocity within streamtube 100 can also be optimized using the same methods. The objective of such an optimization can be the minimization of the total power consumption of the boundary apparatus and the IMSA assembly.

The aforementioned velocity distribution in the proximity of boundary apparatus 95 is exemplified by the snapshot provided by velocity profile 102. This velocity distribution is very different from the velocity distribution in a reference scenario for a full-slip or no-slip condition. In accordance with some embodiments, this difference is provided by an intentional fluid manipulation apparatus. In the embodiment shown in FIG. 7, this fluid manipulation apparatus is embodied by the IMSA assembly. The IMSA assembly manipulates the fluid by imparting a particular spatial induced flow distribution on the fluid. This induced flow can be considered to be superimposed on the fluid flow in a reference scenario in a full-slip condition. In other words, a desired flow velocity distribution can be generated by calculating the induced flow distribution required in order to modify the flow from this reference scenario to the desired flow velocity distribution, and configuring the IMSA assembly in a manner in which this desired induced flow distribution is achieved. The extent of the viscous drag, i.e. the extent of the effect of the boundary layer and the no-slip condition, associated with outside surface 96 is dictated or defined by this superimposed flow, i.e. the superposition of the induced flow and the flow in the reference scenario. This viscous effect can in turn be considered to be superimposed on the aforementioned superimposed flow. As described in the following paragraphs, there are several ways in which the production or generation of the aforementioned induced velocity distribution of the IMSA assembly can be described.

The induced velocity distribution in the proximity of boundary apparatus 95 can be considered to be generated by the rate of change of momentum experienced by a fluid element due to its interaction with upstream IMSA 104. In some embodiments, some fluid elements experience a negative average rate of change of momentum throughout their interaction with upstream IMSA 104. This rate of change of momentum can result in a net decrease of momentum of a fluid element in the proximity of outside surface 96 of boundary apparatus 95 after said fluid element has interacted with upstream IMSA 104. This decrease occurs relative to the reference scenario for a full-slip condition, i.e. relative to the case in which the IMSA assembly does not interact with the fluid. In other words, in some embodiments, upstream IMSA 104 is configured to reduce the average momentum of at least a portion of the fluid flow in the far wake of upstream IMSA 104 in an aforementioned isolated scenario.

In some embodiments, this decrease in the average momentum of the fluid flow in the far wake occurs at least for streamlines which interact with outside surface 96 of boundary apparatus 95, or for streamlines which pass in the proximity of outside surface 96. This reduction of momentum of the fluid flow compared to the free stream fluid flow in the isolated scenario results in a far wake induced velocity which has a non-zero component in the upstream direction as defined by the free stream flow in the isolated scenario. Since outside surface 96 of boundary apparatus 95 is located downstream of upstream IMSA 104, the flow at, or in the proximity of, outside surface 96 of boundary apparatus 95 also experiences an upstream induced velocity. As mentioned, the magnitude and the spatial distribution of this upstream induced velocity at, or in the proximity of, outside surface 96 of boundary apparatus 95 can be configured to reduce the magnitude of the free stream flow in a full-slip scenario compared to a full-slip reference scenario, and hence reduce the average drag of boundary apparatus 95, or the average power consumption associated with the interaction of boundary apparatus 95 with the fluid.

The aforementioned induced velocity distribution can also be generated by free vortices that are shed into the wake by the propeller blades of upstream IMSA 104 in the simplified framework of lifting-line theory. This is similar to the vortex shedding of a helicopter rotor, conventional propeller blade, or wind turbine blade. Note that, in some embodiments, the vortices shed by downstream IMSA 110 also contribute to the induced velocity in the proximity of boundary apparatus 95, such as at the location of velocity profile 102.

The aforementioned induced velocity distribution can also be generated by a suitable lift or thrust distribution along a propeller blade of upstream IMSA 104. Since the induced velocity of upstream IMSA 104 is directed in an upstream direction, i.e., in the positive x-direction of the BAF, for at least a portion of upstream IMSA 104, the operation of upstream IMSA 104 is similar to the operation of a wind turbine. In other words, corresponding to the induced velocity distribution in the wake of upstream IMSA 104, the thrust force experienced by at least a portion of a blade of upstream IMSA 104, such as first propeller blade 105, has a non-zero component in the negative x-direction of the BAF, as indicated by thrust vector 127.

At least a portion of upstream IMSA 104 is configured to extract useful power from the fluid. This power can be extracted in a multitude of ways. For example, an electric generator can be rigidly connected to the drive shaft that is rigidly connected to the propeller blades of upstream IMSA 104. In the embodiment shown in FIG. 7, the drive shaft can be parallel to the axis of rotation of the propeller blades of upstream IMSA 104, and parallel to the x-axis of the BAF. When, in some embodiments, upstream IMSA 104 is configured a conventional propeller, the aforementioned drive shaft is considered to be the rotor hub, or the propeller shaft of the conventional propeller. Since the electric motor is directly connected to the drive shaft, which is directly connected to the propeller blades, this configuration can also be described as a direct drive configuration.

In some embodiments, there can also be a transmission or a gear train between the electric generator and the drive shaft. In some embodiments, there can also be a clutch between the propeller and the transmission. In some embodiments, the transmission can be reconfigured. In other words, the gear ratio can be changed, or gears can be changed. In some embodiments, there can also be a mechanical disc brake attached to the drive shaft, where the brake is configured to be able to arrest, or prevent the rotation of, the drive shaft. The electricity generated by the electric generator due to the rotation of the drive shaft can be stored in an electrical energy storage apparatus. Such an electrical energy storage apparatus can be a battery or a capacitor, for example. The electrical energy storage apparatus can also comprise mechanical elements. For example, the electrical energy storage apparatus can comprise an electric motor or generator, which in turn is configured to accelerate or decelerate the rate of rotation of a flywheel, which stores the energy mechanically in the form of rotational kinetic energy. The electric motor generator can also power a pump that is configured to compress and or expand a gas such as air inside a tank. Note that at least a portion of the energy stored in an electrical energy storage apparatus is able to be extracted at a later point in time. A plethora of such energy storage apparatuses or mechanisms are available.

The electrical power can also be transferred directly to a second actuator, where the transfer can occur via electrical conductors, for example. The second actuator can consume the power instantaneously in some embodiments. The second actuator can be any actuator of an apparatus or assembly of apparatuses associated with boundary apparatus 95. For example, the second actuator can be used to actuate downstream IMSA 110. Thus a portion of the power extracted from the fluid by upstream IMSA 104 can be transferred to downstream IMSA 110, where the power is reinserted into the fluid. In some embodiments, the second actuator can also be used to power a separate apparatus or mechanism, which is not shown in FIG. 7.

The electrical power provided by upstream IMSA 104 can also be split, and used to drive a second actuator, a third actuator, and increase the energy contained within an energy storage apparatus, for instance. In some embodiments, the power extracted from the fluid by upstream IMSA 104 and applied to the drive shaft rigidly connected to the propeller blades of upstream IMSA 104 is transferred mechanically to downstream IMSA 110. This transfer can be facilitated in several ways. For example, the drive shaft rigidly attached to the propeller blades of upstream IMSA 104, where the drive shaft is denoted the "upstream drive shaft", can also be rigidly connected to the drive shaft rigidly connected to the propeller blades of downstream IMSA 110, where the drive shaft is denoted the "downstream drive shaft". In other words, the upstream drive shaft can be identical to the downstream drive shaft. In such a configuration, the upstream and downstream rotors of upstream IMSA 104 and downstream IMSA 110, respectively, are rotating in the same direction. In other embodiments the upstream drive shaft can transfer power to the downstream drive shaft via a transmission, a gear train, or a series of gears and secondary or auxiliary drive shafts. In some embodiments, there can also be a clutch along the load path between the upstream drive shaft and the downstream drive shaft. In some embodiments, the gear ratio, or the transmission ratio, of mechanical connection between the upstream and downstream drive shaft can be reconfigured. In other words, the gear ratio can be changed, or gears can be changed.

In some embodiments, the upstream and downstream rotors of upstream IMSA 104 and downstream IMSA 110, respectively, are rotating in opposite directions. Such a configuration can reduce any power losses associated with the IMSA assembly. This could be a result of downstream IMSA 110 cancelling any swirl imparted on the flow by upstream IMSA 104.

In some embodiments, the angle of attack of the propeller blades of upstream IMSA 104 or downstream IMSA 110 relative to the fluid can be controlled by means of a pitch control mechanism at the rotor hub, such as rotor hub 107. This pitch control mechanism and associated pitch degree of freedom, or "DOF", can comprise an electric motor and a disc brake. Alternatively or concurrently to the disc brake, some embodiments can also comprise a mechanical lock, where the mechanical lock can be configured to lock the pitch DOF of the propeller blade for a given pitch angle relative to the rotor hub. The pitch control mechanism can also involve a hydraulic system and mechanical linkages, such as those found in the collective pitch mechanisms of conventional helicopters or propellers. The pitch control mechanism and the pitch DOF of the propeller blades of upstream IMSA 104 or downstream IMSA 110 can also be configured to allow the propeller blades to be feathered. The pitch angle as well as the rate of rotation of the propeller blades can be controlled, such that the effect of the IMSA assembly on the fluid can be regulated. This in turn would allow the performance of the IMSA assembly to be optimized for different flow conditions, such as different free stream flow velocities.

In the IFMA configuration shown in FIG. 7, downstream IMSA 110 is configured to balance, cancel, or counteract the effect of upstream IMSA 104 and boundary apparatus 95 on the fluid. In this manner, the fluid flow velocity distribution in the far wake, as depicted by velocity profile 103, is substantially equal to the free stream fluid flow velocity distribution, as illustrated by velocity profile 101. During nominal cruise, the power consumed by the downstream IMSA 110 in this process is typically larger than the power extracted by upstream IMSA 104.

The downstream IMSA 110 is configured to impart a positive rate of change of momentum on the fluid, i.e. accelerate the fluid in the negative x-direction. As a result, the induced velocity of IMSA 110 in the far wake of IMSA 110 in an isolated scenario is directed in the negative x-direction of the BAF. The induced velocity of the downstream IMSA 110 in the far wake can be considered to cancel the induced velocity of the upstream IMSA 104 in the far wake.

The desired induced velocity distribution in the far wake of downstream IMSA 110 can also be considered to be generated by free vortices which are shed into the wake by the propeller blades of downstream IMSA 110 in the simplified framework of lifting-line theory. This is similar to the vortex shedding of a helicopter rotor, conventional propeller blade.

The aforementioned induced velocity distribution of downstream IMSA 110 in an isolated scenario can also be considered to be generated by a suitable lift or thrust distribution along a propeller blade of downstream IMSA 110. Since the induced velocity of downstream IMSA 110 is directed in a downstream direction, i.e. in the negative x-direction of the BAF, for at least a portion of downstream IMSA 110 in an isolated scenario, the operation of downstream IMSA 110 is similar to the operation of conventional propeller of a conventional fixed wing aircraft. In other words, corresponding to the induced velocity distribution in the wake of downstream IMSA 110 in an isolated scenario, the thrust force experienced by at least a portion of a blade of downstream IMSA 110, has a non-zero component in the positive x-direction of the BAF, as indicated by thrust vector 128.

Note that, in some embodiments, there is no designated downstream IMSA, such as downstream IMSA 110 in FIG. 7. In such embodiments, the power extracted by an upstream IMSA can be stored or employed to provide thrust via an alternative fluid manipulation apparatus or method. Note that upstream IMSA 104 in FIG. 7 is exerting a force in the negative x-direction of the BAF. During cruising flight, this force would need to at least be cancelled by a suitable thrust force in order to maintain a constant cruise velocity of the BAF. This thrust force could be provided in a wide variety of ways. In FIG. 7, this thrust force is provided by downstream IMSA 110. In other embodiments, this thrust force can be provided by a different thrust apparatus.

In some embodiments, this thrust force can be provided by an increase in the radius of the propeller blades of the upstream IMSA. In such embodiments, the length of a propeller blade of an upstream IMSA is larger than the radius of streamtube 100 shown in FIG. 7. The propeller blade of upstream IMSA 104 can have two distinct portions in this case. A first portion can be the portion of the propeller blade which is located within a first, inside streamtube, which can be of a similar size and configuration, and fulfill a similar purpose as streamtube 100 shown in FIG. 7. This first portion of the propeller blade of the upstream IMSA can be configured to fulfill a similar purpose as the entire upstream IMSA 104 shown in FIG. 7. The remaining, second portion of the propeller blade of such an upstream IMSA can be configured to produce the aforementioned required thrust. The wake of this second portion forms an outside streamtube, which encloses or envelops the inside streamtube. The induced velocity of this thrust producing segment of the upstream IMSA can be uniform throughout the outside streamtube in the far wake in order to minimize the induced power consumption. Thus, the power extracted by the first portion of the propeller blade is directly and mechanically transferred to the second portion of the propeller blade via the rigid structural connection between the first and second portion of the propeller blade. A portion of the associated loss in energy of the fluid within the inside streamtube is used to produce thrust and increase the energy of the fluid within the outside streamtube. Note that such a configuration would produce a momentum deficit in the wake within the inside streamtube, because, as mentioned, there is no designated downstream IMSA in this class of embodiments. Such a configuration would result in a non-uniform velocity distribution in the far wake, and would thus be less efficient than a configuration in which the velocity distribution in the entire far wake, i.e. across both the inside streamtube and the outside streamtube, is substantially uniform. However, such a configuration can nevertheless provide an improvement on embodiments of the prior art due to the recovery of a portion of the energy loss which would otherwise be attributed to viscous drag.

In other embodiments, the aforementioned momentum deficit within the inside streamtube is removed by adding a downstream IMSA to the aforementioned configuration.

In other embodiments, the downstream IMSA can extend beyond streamtube 100. For example, the length of a propeller blade of a downstream IMSA can be larger than the radius of streamtube 100. In this manner the induced power consumption of the thrust producing downstream IMSA can be reduced. In this configuration, it is possible to achieve a uniform far wake induced velocity distribution across the inside and outside streamtubes of the downstream IMSA, which is desirable for minimizing the induced power.

In yet other embodiments, both the upstream IMSA and the downstream IMSA can comprise rotor tip extensions compared to the embodiment shown in FIG. 7. In some such embodiments, the rotor diameter of the upstream IMSA and the downstream IMSA are substantially identical. In other such embodiments, this need not be the case. As before, the rotor tip extensions give rise to an outside streamtube which encompasses the inside streamtube. The inside portions of the rotors of upstream IMSA and the downstream IMSA can be configured in the same manner as described in the context of FIG. 7 and streamtube 100. The outside portions of the rotors can be configured to produce a desired amount of thrust while minimizing the total power consumption, which comprises profile drag and induced drag. For example, the outside portions of upstream IMSA and the downstream IMSA, i.e. the portions associated with the outside streamtube, can be configured in a manner similar to a contra-rotating coaxial rotor, with both the upstream and the downstream IMSA producing thrust in the positive x-direction of the BAF. In another example, the outside portion of upstream IMSA can be configured to produce a thrust which is directed in the positive x-direction of the BAF, and larger in magnitude than the desired thrust required of the outside portions of the upstream and downstream IMSA. Accordingly, the outside portion of downstream IMSA can be configured to produce a thrust which is directed in the negative x-direction of the BAF. Such a configuration can reduce the induced power consumption associated with the outside portions of the upstream and downstream IMSAs compared to configurations in which the thrust vector of both the upstream and the downstream IMSAs is directed in the positive x-direction of the BAF.

In some embodiments, there can be more than a single upstream propeller, such as upstream IMSA 104, and more than a single downstream propeller, such as downstream IMSA 110. There can be several propellers located within streamtube 100 in the proximity of boundary apparatus 95. Using several propellers within streamtube 100 can be desirable in order to maintain a desired velocity distribution within streamtube 100. For example, consider a boundary apparatus which is cylindrical in shape with tapered ends, such as the fuselage of a conventional commercial transport aircraft. In this case, it can be convenient and desirable to place several rotors or propellers along the length of the fuselage. For example, a propeller can be located at the same location along the x-axis of the BAF at which a duct, such as third IMCA 81, is shown to be located in FIG. 6. The propeller can be mounted on the fuselage in a manner in which the fuselage diameter is unchanged, i.e. the fuselage is located within, or passes through the center of, the propeller hub. The circular shape of the fuselage is conducive to a rotor which revolves around the fuselage. The rotor hub can form a rigid ring which is able to rotate around the fuselage. As shown in FIG. 7, the axis of rotation is in this case parallel to the longitudinal axis of the cylindrical fuselage. Several propeller blades can be attached to the rotor hub and perform the desired fluid flow manipulation. An electric motor can power the rotor hub, as well as extract power from the rotation of the rotor hub relative to the fuselage, depending on whether the rotor is in an "upstream" or "downstream" location or configuration. In such a configuration, it is at least in theory possible for a fuselage to be infinitely long and the flow field within streamtube 100 to remain constant on average during nominal, constant velocity cruise, where the average is calculated along the x-axis of the BAF over one distance of separation between the uniformly spaced propellers along the length of the fuselage.

The length of each rotor blade can be a fraction of the diameter of the fuselage. The length of a rotor blade can be on the order of the boundary layer thickness at that particular location in the flow in a no-slip reference scenario. In some embodiments, the ratio of the length of a rotor blade to the maximum thickness of the boundary layer along the outside surface of a boundary apparatus, such as a fuselage, in a no-slip reference scenario is less than two. In some embodiments, this ratio is less than five. In some embodiments, this ratio is less than ten. In some embodiments, this ratio is less than one hundred.

Figure 6:
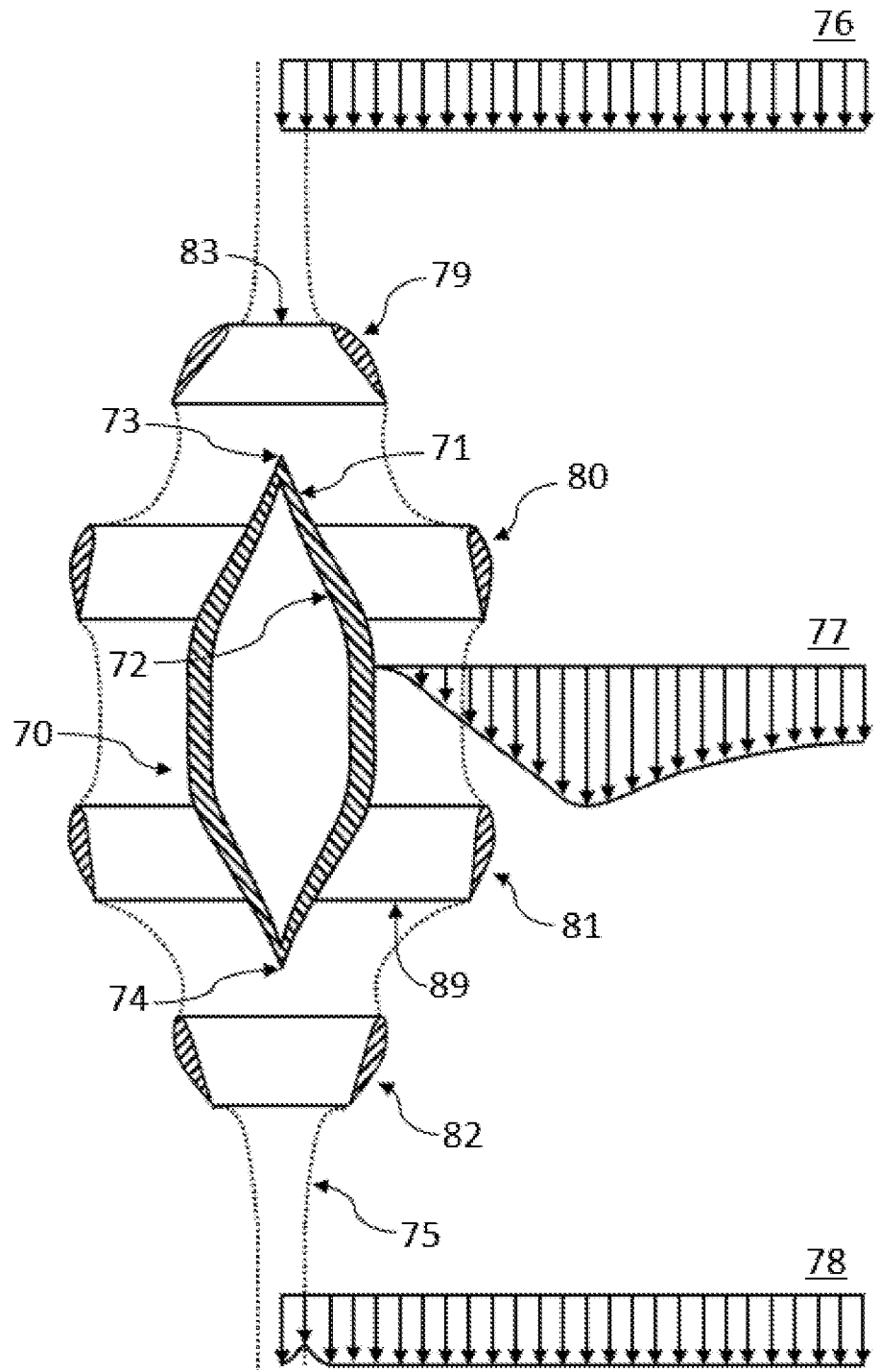
FIG. 6 is a cross-sectional view of an IFMA configuration, according to some embodiments.

FIG. 6 shows a cross-sectional view of another IFMA configuration. Some features of the apparatus shown in FIG. 6, as well as some of the principles of operation of the apparatus share similarities with the apparatus shown in FIG. 7, and will therefore not be described in the same detail in the context of FIG. 6, and vice versa.

FIG. 6 depicts a boundary apparatus 70 moving relative to a surrounding fluid. Boundary apparatus 70 has a leading point 73, and a trailing point 74. The leading and trailing point can also be an edge, such as the leading edge or trailing edge of a wing or an airfoil. In the case of a wing, the leading edge and the trailing edge can be considered to be the leading and trailing stagnation lines for a specified flow condition. In this embodiment, the boundary apparatus is a rigid body which can be described as a thin shell, with a closed outside surface 71 and inside surface 72. In this embodiment, the shape of boundary apparatus 70 is a revolute shape, i.e., it is axially symmetric about an axis passing through the leading point 73 and trailing point 74.

Boundary apparatus 70 can be the hull of a ship, or the fuselage of an aircraft. In other embodiments, boundary apparatus 70 can have a different geometric shape. For instance, the shape of boundary apparatus can be similar to the shape of boundary apparatus 61 shown in FIG. 5. A suitable geometry can be found for any given application. A boundary apparatus can be manufactured using a variety of existing methods and materials.

One can define a "boundary apparatus frame", or "BAF", as follows. The origin is located at the geometric centroid of the volume enclosed by outside surface 71 of boundary apparatus 70. The x-axis is coincident with the straight line connecting the leading point 73 with the trailing point 74, and is directed towards the leading point 73. Unless specified, the z-axis is pointing perpendicularly into the page of the figure.

Three velocity profiles 76-78 are shown. Each arrow in a velocity profile indicates the velocity vector of an incremental fluid element relative to the boundary apparatus, where the incremental fluid element is located at the base of the arrow at the point in time in which the velocity it measured relative to the boundary apparatus. The line connecting the tips of the arrows in a velocity profile describes the continuous velocity distribution.

Boundary apparatus 70 is moving relative to the surrounding fluid. The free stream flow velocity is uniform in space and constant in time in the simplified scenario shown. In FIG. 6 the free stream fluid flow relative to boundary apparatus 70 is directed parallel to, and in the opposite direction of, the x-axis of the BAF, i.e. from the top of the figure towards the bottom. Far upstream of boundary apparatus 70 the velocity of incremental fluid elements is approximately equal to the free stream flow velocity. Thus, the velocity in velocity profile 76 is uniform in space and constant in time, with magnitude and direction equal to the free stream flow velocity relative to the boundary apparatus.

Velocity profile 77 describes the velocity distribution in the proximity of boundary apparatus 70. In this embodiment, there is a no-slip condition on outside surface 71 of boundary apparatus 70. In other embodiments, there can be a non-zero slip velocity along outside surface 71. The velocity profile 77 is similar to the velocity profile 102 shown in FIG. 7. The features of this velocity profile, as well as alternate embodiments thereof, will therefore not be described in the same detail in the context of FIG. 6.

Velocity profile 78 describes the velocity distribution in the far wake of boundary apparatus 70. In the simplified, ideal scenario the velocity profile 78 is substantially equal to the velocity profile 76, as shown in FIG. 6. Note that there is a momentum deficit due to the drag associated with the IMCA assembly, which can arise from pressure drag or viscous drag, for example. In other embodiments, there can also be a momentum deficit due to the drag associated with the boundary apparatus 70.

In accordance with some embodiments, a boundary apparatus, such as boundary apparatus 70 is provided with an intentional fluid manipulation apparatus. In the embodiment shown in FIG. 6, this intentional fluid manipulation apparatus can be described as an IMCA assembly comprising a first IMCA 79, a second IMCA 80, a third IMCA 81, and a fourth IMCA 82. Four IMCAs are shown in this embodiment, however, more or less can be used.

Each IMCA, such as first IMCA 79, can be described as a circular duct. In the embodiment shown in FIG. 6, each duct is configured to produce a lift force with a component in the radially outward direction. The central axis of each circular duct is coincident with, and directed in the direction of, the x-axis of the BAF. In a rough approximation, the effect of a duct on the fluid flow can be considered to be produced by a vortex loop in lifting-line theory. In this simplified model, each vortex loop of each IMCA lies within a plane parallel to the yz-plane. The circulation of each vortex loop is directed in the clock-wise direction around each loop when viewed along the positive x-direction. Each IMCA has a leading edge, such as leading edge 83 of first IMCA 79, and a trailing edge, such as trailing edge 89 of third IMCA 81.

Streamline 75 describes the boundary of a streamtube, which has a circular cross-section when viewed along the x-direction. The dotted streamline 75 in FIG. 6 schematically indicates the approximate location of the stagnation streamline of first IMCA 79, i.e. the streamline which is incident on the leading edge stagnation line of first IMCA 79. The volume enclosed by all such streamlines can be described as a streamtube.

Note that streamtube 75 shown in FIG. 6 is only an example for a certain operating conditions, and a certain configuration of the IMCA assembly. For other operating conditions, such a different free stream velocity magnitude, the shape of streamtube 75 can be different. For example, streamtube 75 can pass within the interior region of second IMCA 80 rather than also being incident on the leading edge stagnation line of second IMCA 80. In order to avoid flow separation and the associated pressure drag increase, it can be desirable for an IMCA to not be located within the wake of an upstream IMCA, i.e. along, or in proximity of, the stagnation streamline of an upstream IMCA. This can increase the viscous skin friction drag losses associated with the IMCA assembly, however.

Each IMCA in the IMCA assembly is rigidly connected to boundary apparatus 70 via a connection apparatus. This apparatus is not shown in FIG. 6 for clarity.

In other embodiments, an IMCA, such as IMCA 79, can comprise several ducts. In such a configuration, an IMCA can be described as a multi-element airfoil as opposed to a single element airfoil shown in FIG. 6. For example, an IMCA can comprise a four-element airfoil, with each section effectively forming a separate duct. Such a configuration can increase the maximum lift coefficient of the IMCA.

The effect of the IMCA assembly on the fluid flow is the creation of a local induced velocity distribution in the proximity of the IMCA assembly. In general, the induced velocity within the IMCA assembly, i.e. in the proximity of the central axis of the IMCA assembly, has a non-zero component in the positive x-direction of the BAF. A desired distribution of induced velocity can be achieved by placing IMCAs, such as first IMCA 79 and second IMCA 80 at suitable locations within the fluid flow, and by selecting an appropriate strength of circulation, or an appropriate lift force per unit circumference.

In accordance with some embodiments, the IMCA assembly is configured in a manner in which the magnitude of the flow velocity at the outside surface 71 of boundary apparatus 70 in a full-slip scenario is reduced compared to a full-slip reference scenario. This reduction can result in a lower skin friction drag at outside surface 71 in a no-slip scenario. This reduction can arise from the reduction of the effective free stream flow at outside surface 71, the establishment or maintenance of laminar flow on outside surface 71, or the reduction in the Reynolds number of the flow at outside surface 71, for example. For some operating conditions, this reduction in the drag associated with boundary apparatus 71 can be larger than the added drag of the IMCA assembly.

Figure 8:
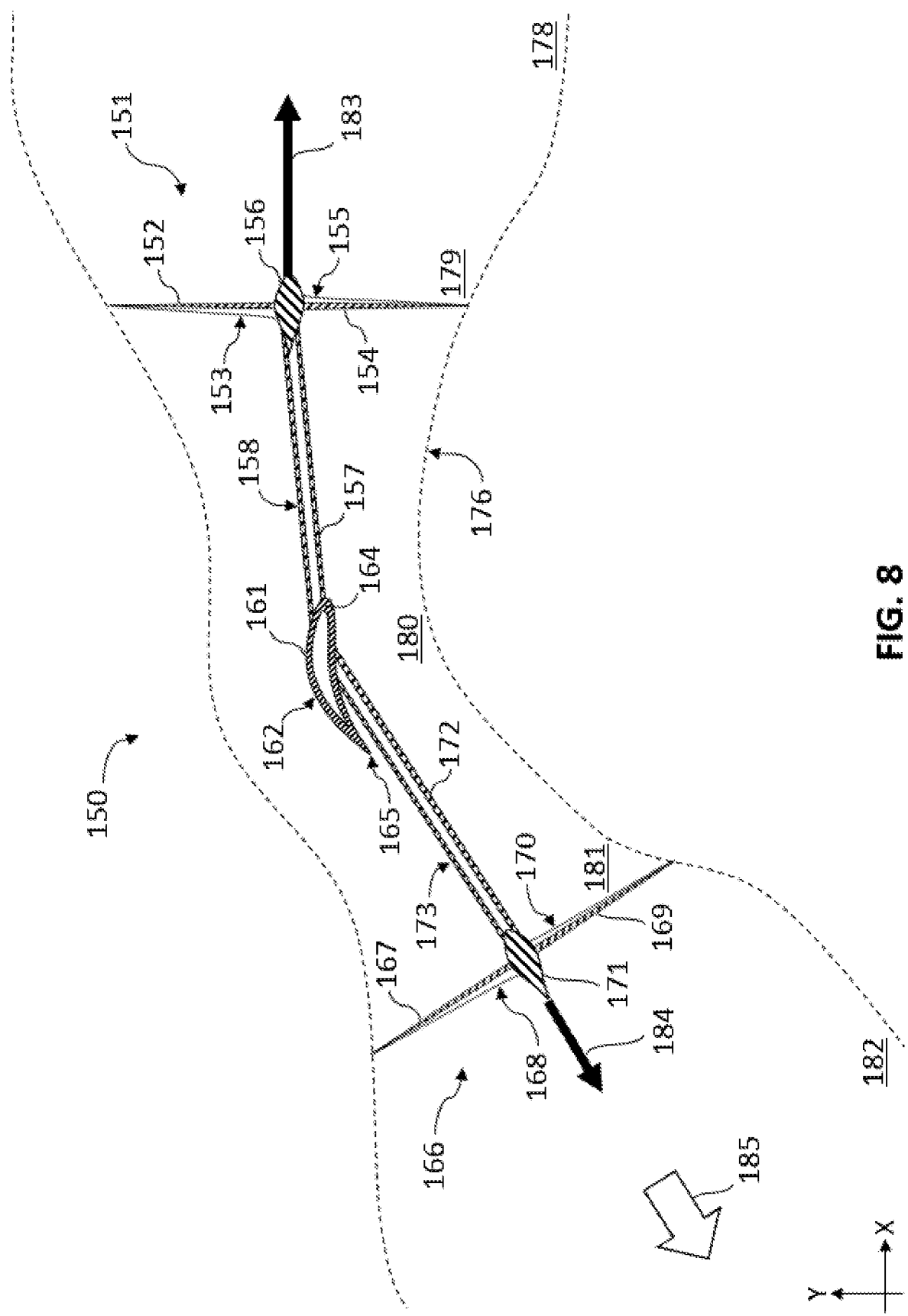
FIGS. 8 and 9 are cross-sectional and frontal views, respectively, of an IFMA configuration, according to some embodiments.

FIG. 8 is a cross-sectional view of IFMA configuration 150. The center of mass of IFMA configuration 150 is moving with a velocity in an inertial frame, where the velocity is constant in magnitude and direction in space and time. The velocity is aligned with the X-axis, i.e. directed in the positive X-direction.

There is an upstream IMSA 151, which in this embodiment can be described as a propeller. The cross-sectional view of upstream IMSA 151, shows a first propeller blade 152 and a second propeller blade 154. The trailing edge 153 of the first propeller blade 152 and the leading edge 155 of the second propeller blade 154 are also visible. The propeller blades are structurally supported by rotor hub 156. The thrust of IMSA 151 is indicated by thrust vector 183. At station 179, a positive rate of change of momentum is applied to the fluid by upstream IMSA 151 in this embodiment.

There is a downstream IMSA 166, which in this embodiment can be described as a propeller. The cross-sectional view of downstream IMSA 166, shows a first propeller blade 167 and a second propeller blade 169. The trailing edge 168 of the first propeller blade 167 and the leading edge 170 of the second propeller blade 169 are also visible. The propeller blades are structurally supported by rotor hub 171. The thrust of IMSA 166 is indicated by thrust vector 184. At station 181, a negative rate of change of momentum is applied to the fluid by downstream IMSA 166. Downstream of the IFMA configuration 150, the direction of the flow within streamtube 176 relative to IFMA configuration 150 is indicated by arrow 185.

A middle IMSA 161 is also shown. In this embodiment, the middle IMSA 161 can be described as a wing. For simplicity, the wing 161 is a straight wing. The wing can be rigidly attached to a fuselage, for example. For clarity, a fuselage is not shown. Middle IMSA 161 can be configured in a similar manner as the fixed wing of a conventional fixed wing aircraft. Middle IMSA 161 produced a lift force that is directed in the positive Y-direction and negative X-direction. Note that the associated deflection of the direction of the flow within streamtube 176 is exaggerated for illustrative purposes.

Middle IMSA 161 comprises an outside surface 162, a trailing edge 165, and bulk material 164. Bulk material 164 can comprise a metal such as aluminium or steel, or a composite such as fiberglass or carbon fiber. Upstream IMSA 151 is rigidly attached to middle IMSA 161 by a hollow connecting rod 157 with outside surface 158. Downstream IMSA 166 is rigidly attached to middle IMSA 161 by a connecting rod 172 with outside surface 173.

In other embodiments, connecting rod 157 or connecting rod 172 are rotably connected to middle IMSA 161 or an associated middle support apparatus. In some embodiments, connecting rod 157 or connecting rod 172 are rotably connected to hub 157 or hub 171 respectively. The rotating connection allows the configuration to be adapted to different operating conditions. A rotating connection can contribute to the control the pitch angle of the middle IMSA 161 and any associated apparatus, such as a fuselage, during cruise or maneuvering.

In this particular embodiment, the magnitude of upstream thrust vector 183 is larger than the magnitude of the downstream thrust vector 184. The upstream IMSA 151 and the downstream IMSA 166 therefore produce a net thrust force with a non-zero component in the positive X-direction. This net thrust can therefore contribute to the cancellation of any drag forces acting on IFMA configuration 150. In other embodiments, the magnitudes of these thrust vectors can be substantially identical. In yet other embodiments, the magnitude of upstream thrust vector 183 is smaller than the magnitude of the downstream thrust vector 184.

Upstream IMSA 151 is configured to increase the local free stream flow velocity of the middle IMSA 161 to a value which is larger than the free stream flow velocity of middle IMSA 161. Downstream IMSA 166 is configured to recover at least a portion of the excess thrust and excess energy transferred to the fluid by upstream IMSA 151 throughout this process. The induced drag of the middle IMSA 161 can be reduced compared to the baseline scenario in which the same middle IMSA 161 produced the same amount of lift without an upstream IMSA 151 and downstream IMSA 166.

As a result, the average flow velocity magnitude at station 180 is larger than at station 178 and station 182. The streamtube 176 at station 180 has a smaller streamwise cross-sectional area than at station 182 or 178. This increase in the streamwise cross-sectional area of streamtube 176 at station 182 compared to station 180 can be considered to increase the aspect ratio or the span of middle IMSA 161.

Figure 9:
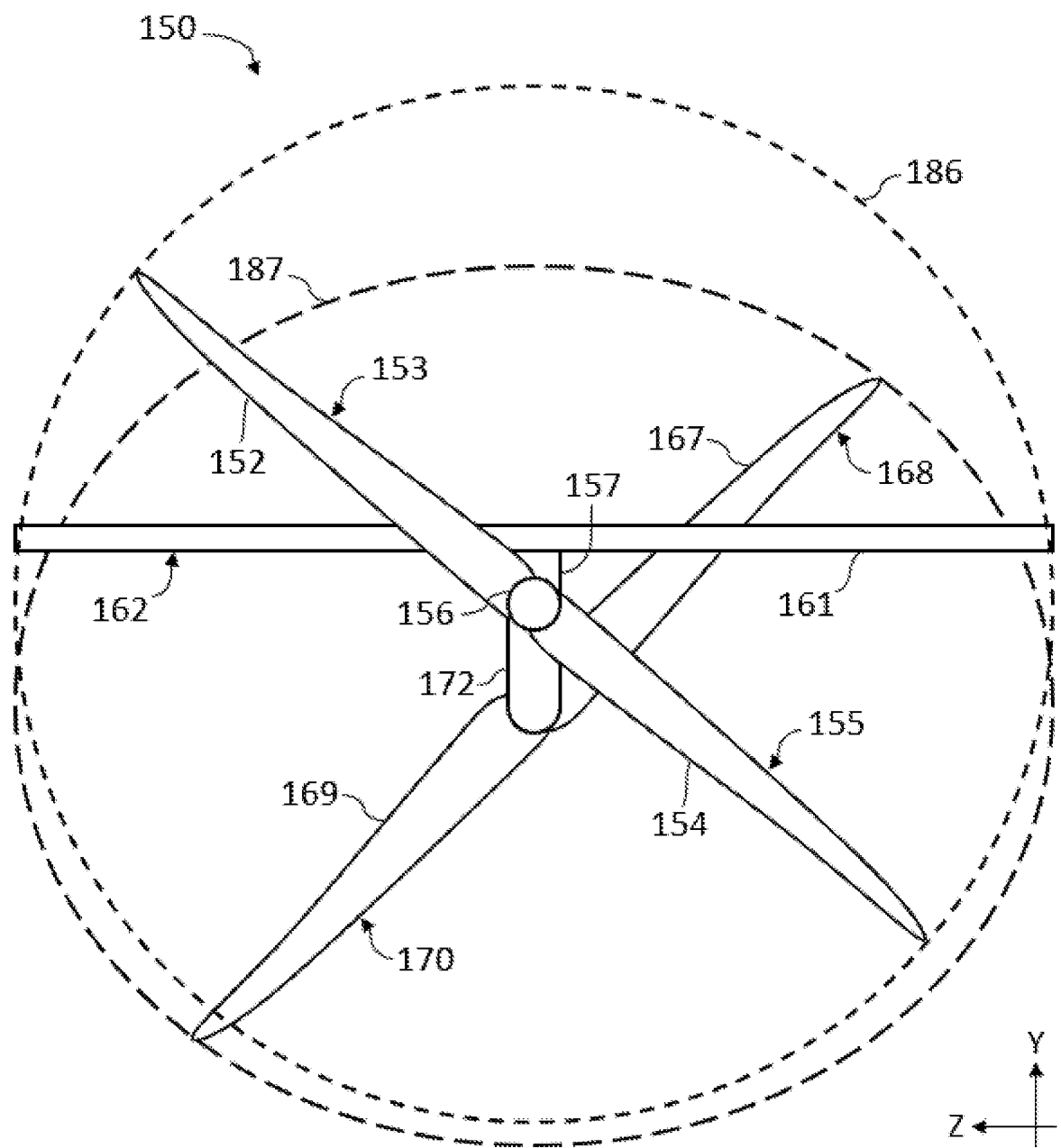

FIG. 9 is a frontal view of the IFMA configuration 150 shown in FIG. 8. Both the upstream IMSA 151 and the downstream IMSA 166 can rotate in a counter-clockwise direction when viewed in the negative X-direction. Alternatively, the upstream and downstream IMSAs can be rotating in opposite directions.

In other embodiments, or an upstream or downstream IMSA can comprise several individual propellers. These propellers can be offset from one another in the streamwise direction. An upstream or downstream IMSA can comprise counter-rotating coaxial propellers, for example. In some embodiments, or upstream or downstream IMSA can comprise several propellers distributed along the width of the streamtube. In other words, the propellers can also be offset from one another in a direction transverse to the streamwise direction.

The path followed by the tips of the propeller blades of upstream IMSA 151 is shown by dashed line 186. The path followed by the tips of the propeller blades of downstream IMSA 166 is shown by dashed line 187 in FIG. 9.

FIGS. 10, 11, 12, and 13 show perspective, side, top, and rear views, respectively, of IFMA configuration 200, which includes a middle IMSA 201. For simplicity, the middle IMSA 201 can be configured as a straight wing with an elliptical spanwise chord distribution, a constant airfoil shape, and zero twist. The wing can be rigidly attached to a fuselage, for example. For clarity, a fuselage is not shown. Middle IMSA 201 can be configured in a similar manner as middle IMSA 161, and vice versa. Middle IMSA 201 can be configured in a similar manner as a wing or hydroplane of an aircraft or ship. Middle IMSA 201 comprises an outside surface 202 and trailing edge 205.

An IMCA 206 is configured to increase the local free stream flow of middle IMSA 201. In other words, the magnitude of the flow velocity at station 224 is artificially increased by IMCA 206 compared to the magnitude of the flow velocity at upstream station 223 or downstream station 224. IMCA 206 can be considered to be a duct.

Figure 13:
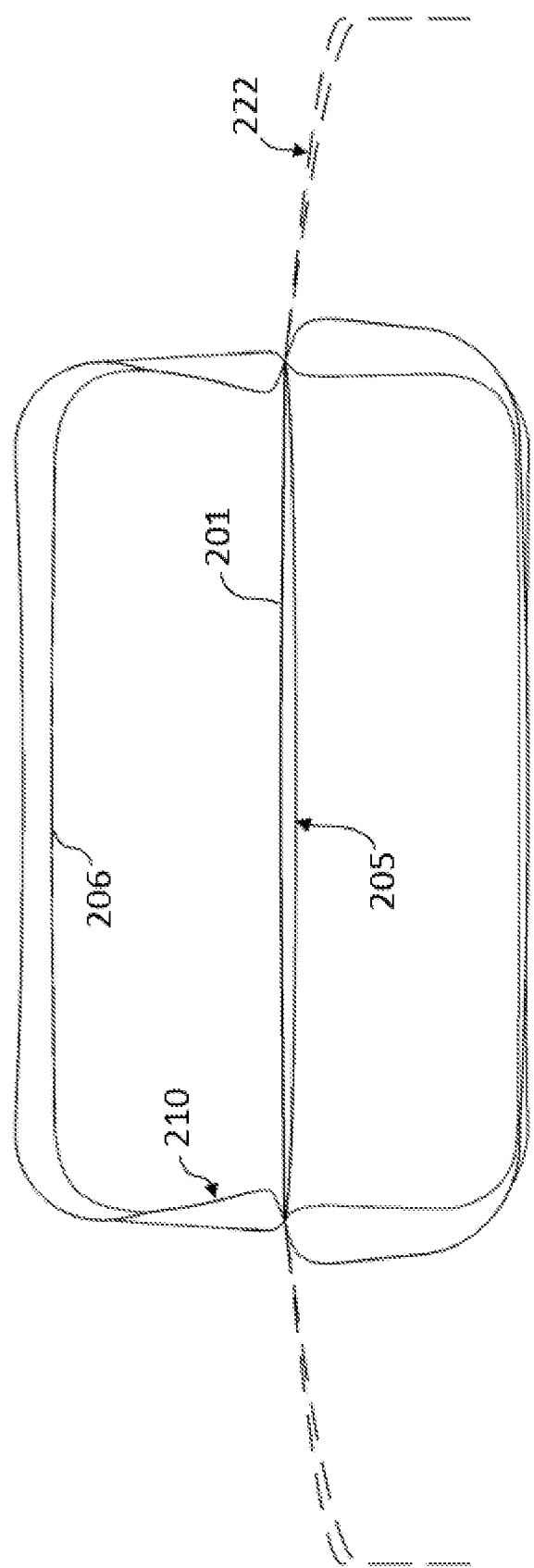

IMCA 206 is rigidly attached to IMSA 201. IMCA 206 comprises an outside surface 207 and a trailing edge 210. In this embodiment, IMCA 206 is rectangular in shape when viewed in the streamwise direction, as shown in FIG. 13. In other embodiments, IMCA 206 can be elliptical, or circular in shape. In other embodiments IMCA can describe a mirrored Bell shape, where the mirroring plane is coincident with the span of the wing.

IMCA 206 can be configured to not shed any vorticity in the framework of lifting line theory. In other words, the circulation associated with IMCA 206 is constant along the spanwise length of IMCA 206. In other embodiments, IMCA 206 can also shed vortices. For example, IMCA 206 can be configured to contribute to the net lift of IFMA configuration 200. In such embodiments, IMCA 206 can be considered to be a conventional closed wing, or annular wing, with a constant spanwise circulation added to the bound vorticity of the IMCA that is shed into the far wake of the IMCA. In other words, the IMCA can be considered to be a superposition of an IMCA and an IMSA. In some embodiments, middle IMSA 201 can also be described as a closed wing.

The varying twist angle of IMCA 206 along the span of IMCA 206 is a result of the effect of IMSA 201 on the flow field and the requirement for the bound vorticity or the circulation of IMCA 206.

In some embodiments, IFMA configuration 200 can include several individual closed wings configured in a similar manner as IMCA 206. These individual IMCAs, can be offset in the streamwise direction, in a manner similar to multi-element airfoils. The individual IMCAs can also be offset in a direction perpendicular to the local streamwise direction. An IMCA can be considered to lie within another IMCA. For example, a first circular IMCA can be considered to be arranged concentrically with a second circular IMCA.

Streamline 222 illustrates the reduction in the cross-sectional area of the streamtube enclosed by IMCA 206 at station 224 due to the acceleration of the flow by IMCA 206. The cross-sectional area of this streamtube is larger at station 225, which corresponds to a larger effective span of IMSA 201.

Figure 10:
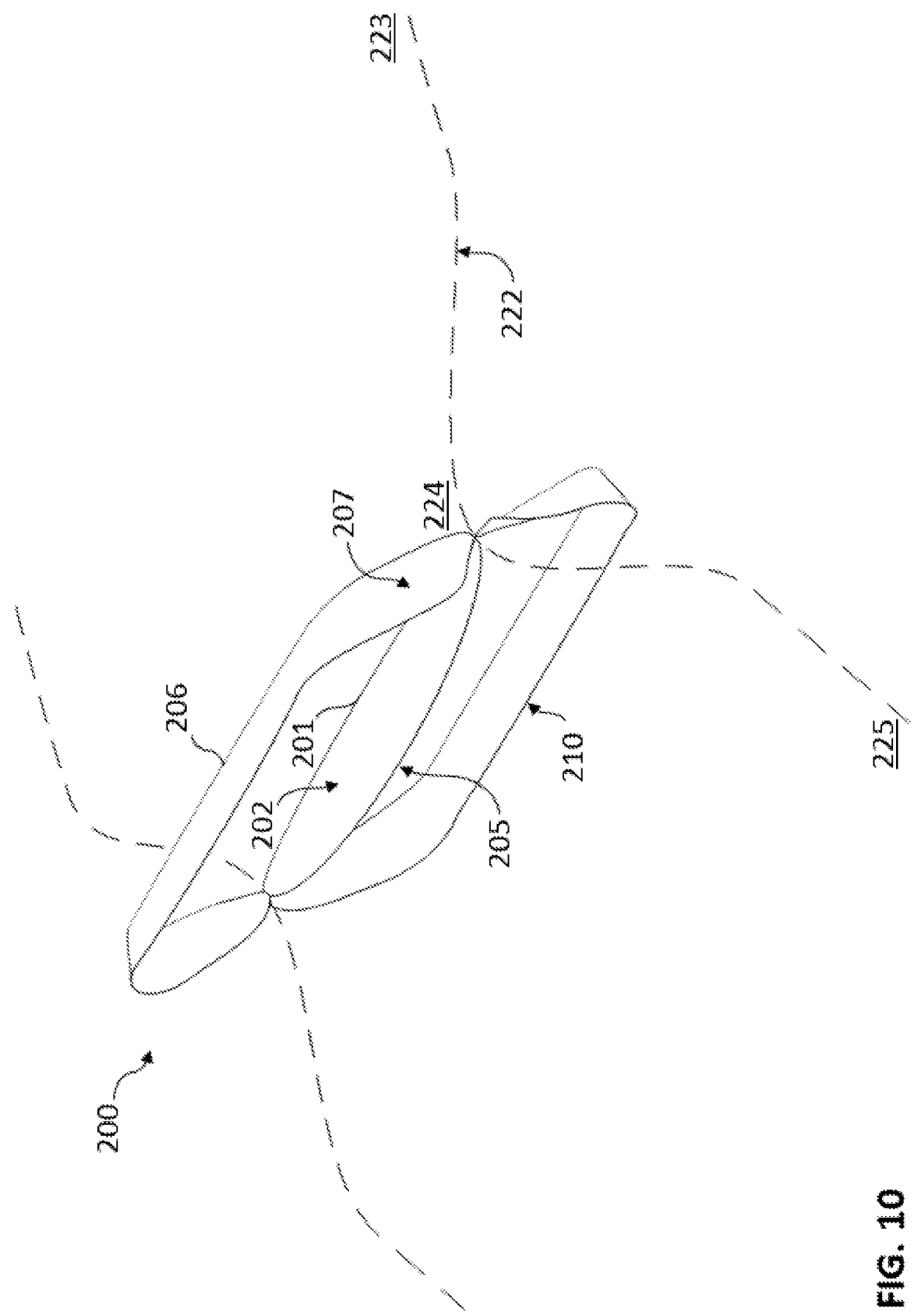
FIGS. 10, 11, 12, and 13 are perspective, side, top, and rear views, respectively, of an IFMA configuration, according to some embodiments.
Figure 11:
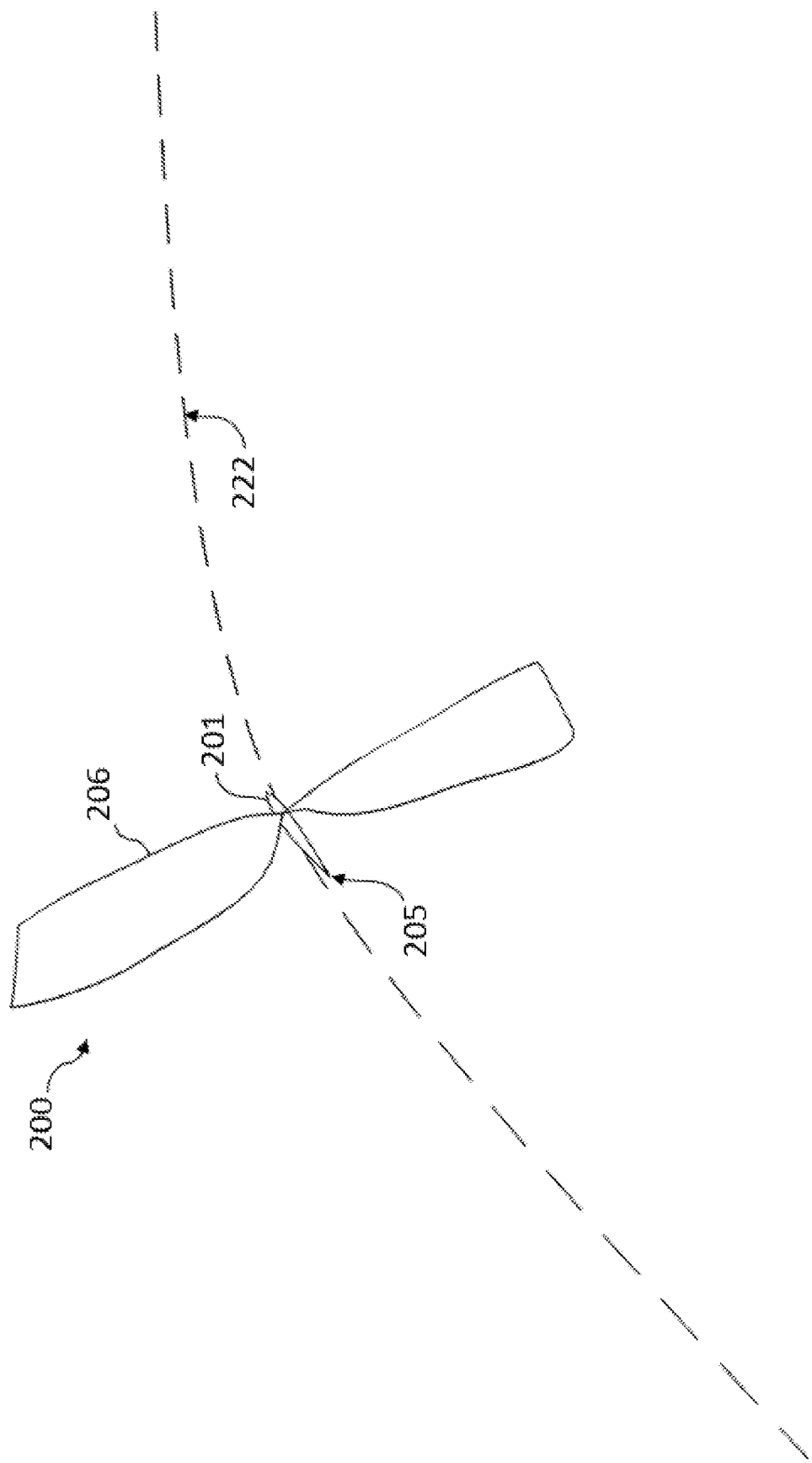
Figure 12:
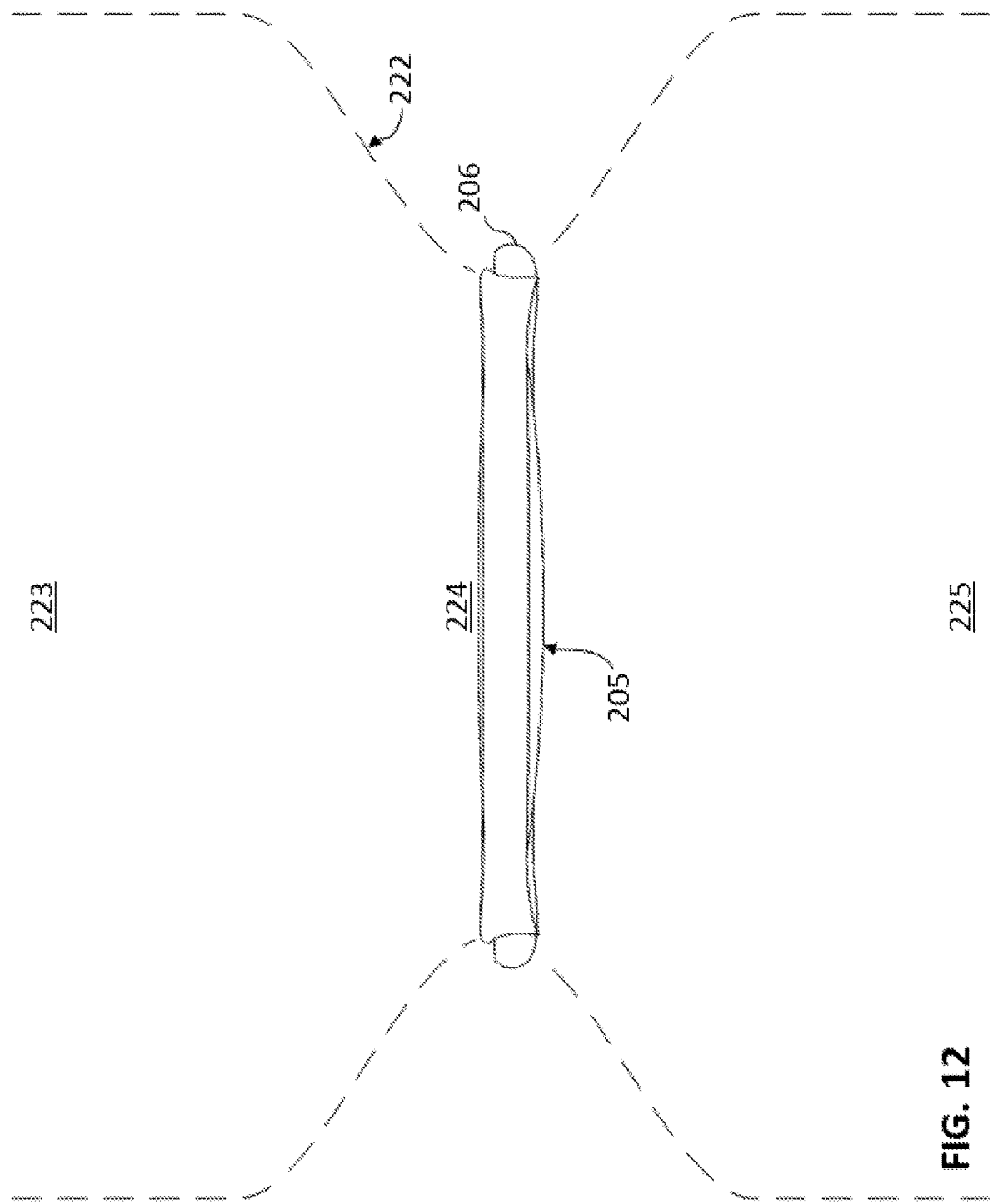
Figure 14:
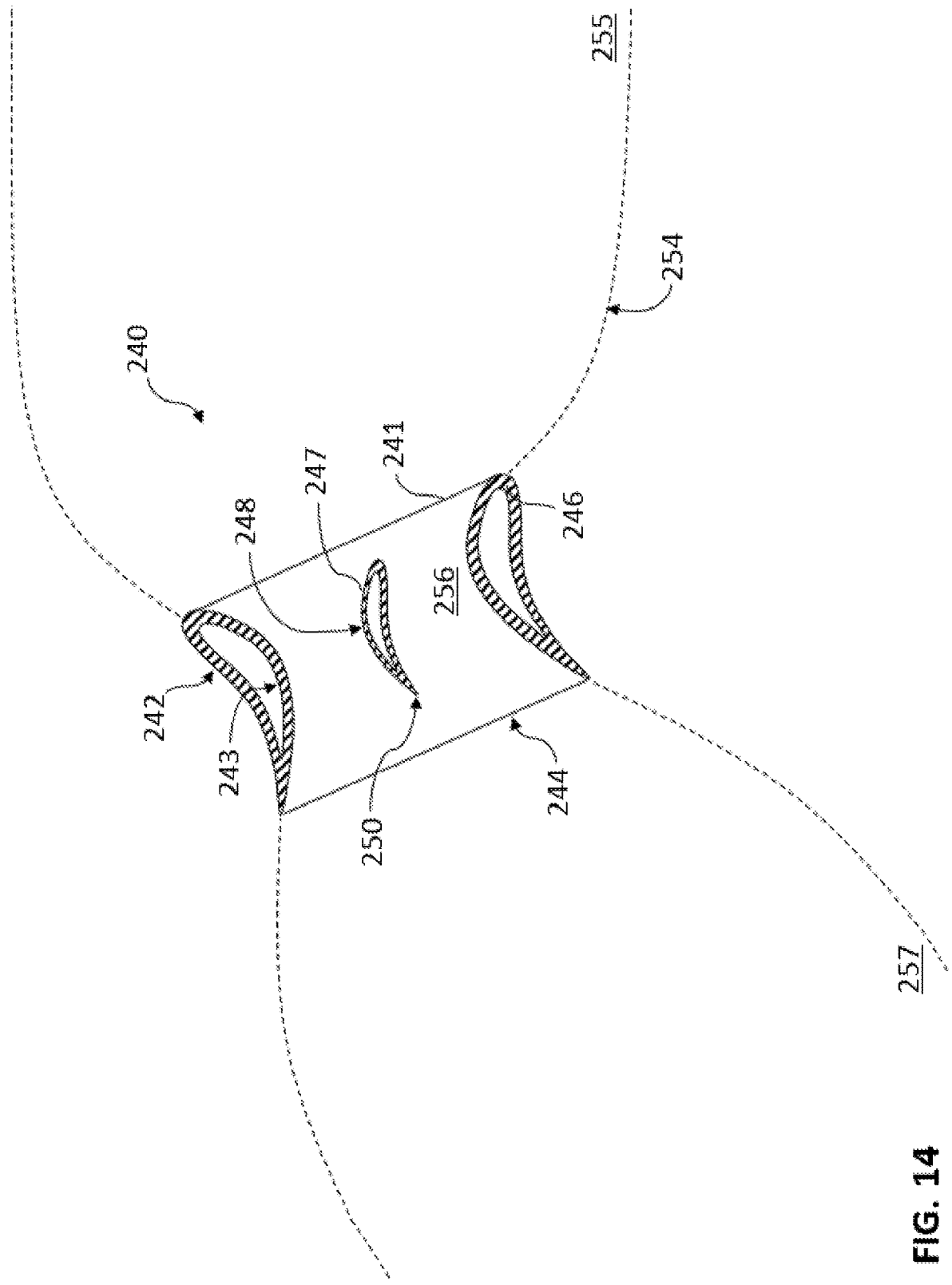
FIG. 14 are cross-sectional, perspective, oblique view an IFMA configuration, according to some embodiments.

FIG. 14 is a cross-sectional view of an IFMA configuration 240, which is configured in a similar manner as IFMA 200 shown in FIG. 10. In this embodiment, the duct 241 does shed vorticity into the wake. Therefore, duct 241 is also referred to as IMSA 241. IMSA 241 can be considered to be a superposition of an IMCA and an IMSA. IMSA 241 is configured to increase the local free stream velocity of middle IMSA 247.

IMSA 241 is substantially axially symmetric in this embodiment. IMSA 241 comprises an outside surface 242, an inside surface 243, bulk material 246, and a trailing edge 244. Bulk material 246 can be configured in a similar manner as bulk material 164. A middle IMSA 247 is configured in a similar manner as middle IMSA 201. Middle IMSA 247 comprises an outside surface 248 and a trailing edge 250.

Streamtube 254 encloses all streamlines that encompass, i.e. pass through the interior of, IMSA 241. The cross-sectional area of streamtube at upstream station 255 is larger than the cross-sectional area at station 256, which in turn is smaller than the cross-sectional area at downstream station 257.

Figure 15:
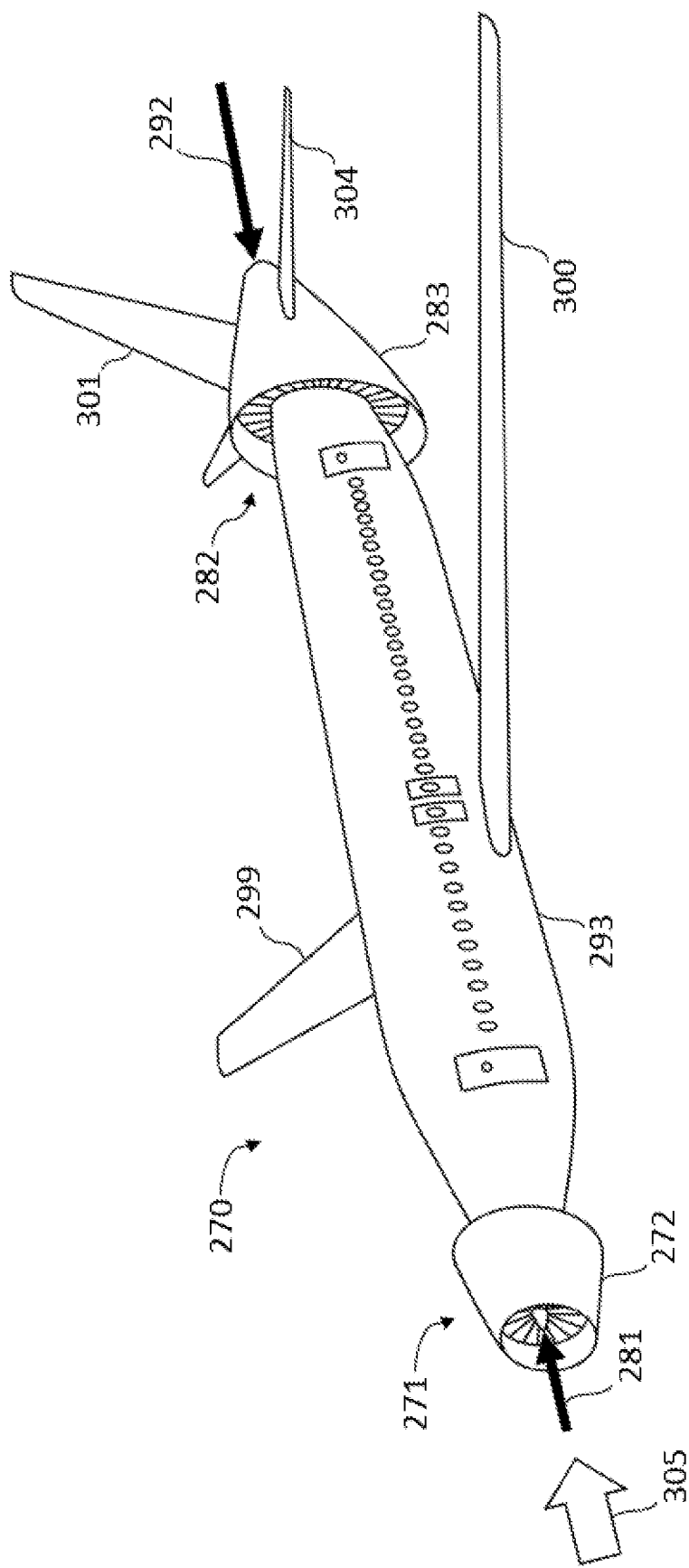
FIGS. 15-18 are oblique views of various IFMA configurations, according to some embodiments.

FIG. 15 is a perspective view of another IFMA configuration 270. Some features of the apparatus shown in FIG. 15, as well as some of the principles of operation of the apparatus share similarities with the apparatus shown in the other figures, and FIG. 7 in particular, and will therefore not be described in the same detail in the context of FIG. 15, and vice versa.

IFMA configuration 270 is depicted as a fixed wing aircraft, such as a commercial transport, or a jet airliner, such as the Boeing 737 or the Airbus A320. There is fuselage 293, a left wing 300 and a right wing 299, a vertical tail 301 comprising a rudder, and a full-flying left horizontal stabilizer 304 and a full-flying right horizontal stabilizer. The flight direction of IFMA 270 is substantially in the direction of thrust vector 292 during nominal level cruise. The free stream flow direction of the air surrounding embodiment 270 relative to embodiment 270 during nominal level cruise is indicated by arrow 305.

There is an upstream IMSA 271, which in this embodiment can be described as a ducted fan. The duct in this embodiment is configured to decelerate the flow prior to encountering the fan disc located within the fan. For some embodiments, wave drag losses associated with the fan disc can be avoided or mitigated in this manner. Upstream IMSA 271 comprises a duct 272 and a fan disc. Upstream IMSA 271 is configured to apply a force on IFMA configuration 270 that is directed in the same direction as the average free stream flow relative to IFMA 270, as indicated by thrust vector 281. Upstream IMSA 271 is configured to extract energy from the surrounding fluid. IFMA 270 is configured to transfer at least a portion of this energy to downstream IMSA 282. As mentioned this transfer can be facilitated by a mechanical drive shaft connecting the fan disk of upstream IMSA 271 to the fan disk of downstream IMSA 282. The fan disk of upstream IMSA 271 can transmit power to the fan disk of downstream IMSA 282 via a direct, rigid, mechanical connection, for instance. The fan disk of upstream IMSA 271 can transmit power to the fan disk of downstream IMSA 282 via a drive shaft and a gear train. Said drive shaft can pass through fuselage 293. The fan disk of upstream IMSA 271 can transmit power to the fan disk of downstream IMSA 282 via an electric generator, which transmits power to an electric motor which via electrical wires or conductors, where the electric motor transmits power to the fan disk of downstream IMSA 282. Upstream IMSA 271 and downstream IMSA 282 are rigidly attached to fuselage 293.

Downstream IMSA 282 can be described as a turbofan engine in some embodiments. In the case in which power is transferred from upstream IMSA 271 to downstream IMSA 282 electrically, downstream IMSA 282 can be described as a hybrid electric turbofan engine. In other embodiments, downstream IMSA 282 can be described as a turbojet engine. Downstream IMS 282 comprises a duct 283. Downstream IMSA 282 is configured to apply a force on embodiment 270 which is directed in the opposite direction as the average free stream flow relative to IFMA configuration 270, as indicated by thrust vector 292. In this embodiments, the magnitude of the thrust of downstream IMSA 282 is larger than the magnitude of the thrust of upstream IMSA 271. Thus, downstream IMSA 282 is configured to satisfy any outstanding thrust requirements of IFMA configuration 270. In other embodiments, at least one separate propulsion unit or engine can be attached to at least one wing. Such a separate engine can be a conventional turbofan or a hybrid electric turbofan, for example.

Upstream IMSA 271 can be configured to artificially reduce the local free stream flow of at least fuselage 293, and downstream IMSA 282 is configured to cancel at least a portion of the reduction in the flow velocity in the wake of and in the proximity of fuselage 293.

In some embodiments, upstream IMSA 271 can be considered to create an artificial boundary layer for fuselage 293, where the boundary layer is approximately enclosed by the streamtube which passes through the interior of duct 272. Note that the fuselage 293 and the artificial boundary layer can also be considered to be enveloped by a natural boundary layer. Upstream IMSA 271 is configured to modify the velocity profile within this artificial boundary layer, or in the proximity of the wetted surface of fuselage 293, in a manner in which the drag of the fuselage 293, and IFMA configuration 270 as a whole, is reduced compared to a baseline scenario in which there is no upstream IMSA 271, i.e. compared to the scenario in which the fuselage is enveloped only by a natural boundary layer. The reduction in drag can comprise a reduction in the viscous drag, and/or a reduction in the wave drag or compressibility drag, for example. The drag reduction is associated with the modification of the spatial profile of the fluid flow velocity relative to fuselage 293 by the upstream IMSA 271, and, to a lesser extent, downstream IMSA 282.

The reduction of the magnitude of the local free stream fluid flow velocity of fuselage 293, the reduction in the fluid flow velocity at, and relative to, the wetted surface of fuselage 293, as well as the generation of a more favorable velocity profile in the vicinity of wetted surface of fuselage 293, by upstream IMSA 271 can contribute to said reduction in viscous drag. A more favorable velocity profile can comprise a reduced peak spatial fluid flow velocity gradient, or a reduced spatial average magnitude of the spatial fluid flow velocity gradient in the vicinity of IFMA configuration 270, for example.

The reduction in the wave drag can be a result of the more gradual change in the fluid flow direction as the fluid flows around IFMA configuration 270, or a more gradual displacement of the fluid by IFMA configuration 270. This is facilitated by the deceleration of the fluid flow by upstream IMSA 271 and the acceleration of the fluid flow by IMSA 282. The strength of the disturbance to the fluid flow by IFMA configuration 270 can thus be reduced, which can reduce the wave drag associated with IMFA configuration 270.

The reduction in drag can reduce the power consumption of IFMA configuration 270 compared to the baseline scenario or allow the IFMA configuration 270 to move faster relative to the fluid for a given power consumption. This can increase the range or the top speed of IFMA configuration 270.

Figure 16:
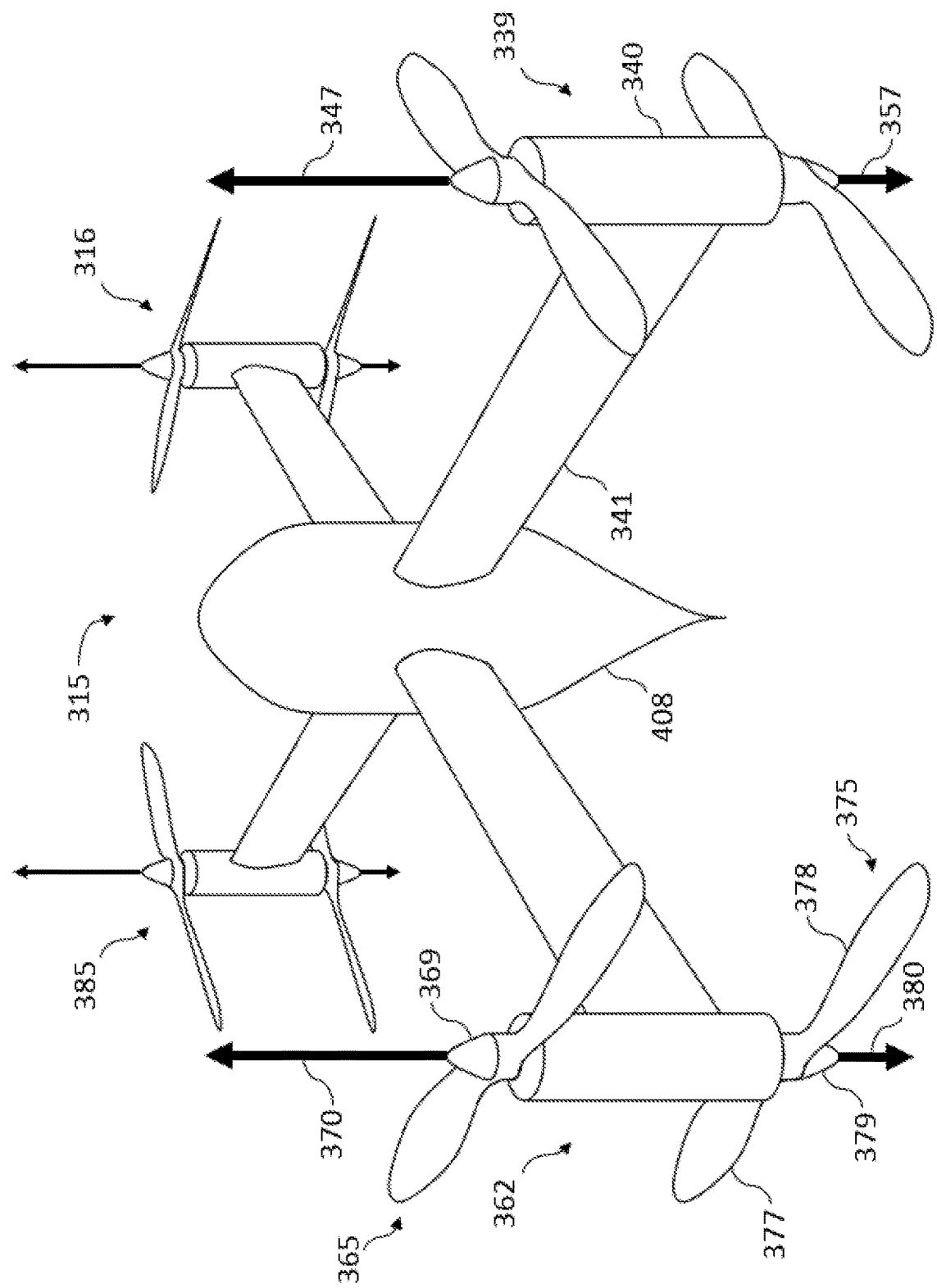

FIG. 16 is an oblique top view of another IFMA configuration 315. Some features of the apparatus shown in FIG. 16, as well as some of the principles of operation of the apparatus share similarities with the apparatus shown in the other figures, and FIG. 3 in particular, and will therefore not be described in the same detail in the context of FIG. 16, and vice versa.

IFMA configuration 315 can be described as a quadrotor helicopter or quadcopter. Embodiment 315 can also be described as an octorotor or multitrotor. IFMA configuration 315 comprises four IMSA assemblies, such as IMSA assemblies 316, 339, 362, and 385. Each IMSA assembly comprises an upstream IMSA, such as upstream IMSA 365 of IMSA assembly 362, and a downstream IMSA, such as downstream IMSA 375 of IMSA assembly 362.

Each upstream or downstream IMSA can be described as a propeller. Each propeller can include a first propeller blade, such as first propeller blade 377 of downstream IMSA 375, and a second propeller blade, such as second propeller blade 378 of downstream IMSA 375. In other embodiments, a propeller can include at least one, or only one blade. In other embodiments, a propeller can include at least 3 blades. A propeller hub, such as propeller hub 379 or 369 connect each propeller to a drive shaft or actuator.

IFMA configuration 315 is shown in a hover. The flow induced by an IMSA assembly is directed in the vertically downwards direction, i.e. substantially aligned with thrust vector 380.

An upstream IMSA, such as upstream IMSA 365, is configured to produce a thrust force acting on IFMA configuration 315 which is directed in the upwards direction, as indicated by thrust vectors 370 or 347. A downstream IMSA, such as downstream IMSA 375, is configured to produce a thrust force acting on embodiment 315 which is directed in the downwards direction, as indicated by thrust vectors 380 or 357.

An upstream IMSA is configured to increase the local free stream flow velocity relative to itself compared to a scenario in which an IMSA assembly comprises just one IMSA, i.e. only the upstream IMSA. A corresponding downstream IMSA is configured to cancel any excess momentum in the fluid flow in the wake of the upstream IMSA. Note that, during nominal hover, the sum of the net thrust produced by all four IMSA assemblies is substantially equal to the weight of IFMA configuration 315. During nominal hover, the net thrust produced by any one IMSA assembly is substantially equal to the net thrust produced by any other of the four IMSA assemblies. Downstream IMSA is configured to produce a thrust force acting on embodiment 315 in the direction of the fluid flow relative to embodiment 315 through the upstream IMSA, as indicated by thrust vectors 380 or 357. The magnitude of the thrust vector of a downstream IMSA is smaller than the magnitude of the thrust vector of the corresponding upstream IMSA during nominal hover.

Each IMSA assembly in IFMA configuration 315 also comprises a nacelle, such as nacelle 340, which houses actuators, generators, gear boxes, or drive shafts which facilitate the transfer of energy from a downstream IMSA to an upstream IMSA. Note that a downstream IMSA of a first IMSA assembly can also transmit power to an upstream IMSA of a second IMSA assembly.

In the configuration shown in FIG. 16, the induced power consumption of an IMSA assembly is lower than the induced power consumption of an equivalent baseline or reference configuration, in which the effect of the downstream IMSA on the fluid is negligible, i.e., the thrust of the upstream IMSA is substantially equal to the net thrust requirement. In the baseline configuration an IMSA assembly can be considered to only comprise the upstream IMSA. Note that, as mentioned, an IMSA, such as the upstream IMSA, can comprise several propellers or thrust apparatuses in some embodiments. In this case, the baseline configuration is identical to a conventional quadrotor helicopter.

Each IMSA assembly is rigidly connected to fuselage 408 via a beam. Each beam is enclosed in an aerodynamic or hydrodynamic fairing, such as beam fairing 341. In some embodiments, the beam fairings are rotably connected to the beam, i.e., able to rotate relative to fuselage 408 and the corresponding nacelle. In some embodiments, at least one beam fairing can be employed to produce lift during nominal level cruise, where the lift is generated in a similar manner as the lift of a conventional fixed wing aircraft, where the fuselage long axis is oriented in a substantially horizontal direction, i.e. the direction of motion in an inertial frame, and where at least one IMSA assembly is configured to produce a net thrust which counteracts the drag acting on IFMA configuration 315. Note that the pitch angle of the propellers of some IMSA can be modified in some embodiments. Note that, during cruise, the propellers of some IMSA assemblies can be feathered.

In some embodiments, the upstream IMSA can be powered by an electric motor. In some embodiments, upstream IMSA can be powered by a brushless DC motor comprising permanent magnets. In some embodiments, an IMSA assembly can be powered by an AC induction motor. In some embodiments, the drive shaft of an upstream IMSA is rigidly connected to the drive shaft of the corresponding downstream IMSA. In some embodiments the actuator powering the drive shaft is rigidly connected to the drive shaft in a direct drive configuration. In some embodiments, the actuator is connected to the drive shaft via a clutch or gear train. The power can be provided by a battery, an internal combustion engine, or a turboshaft engine, for example. The actuator powering one or more IMSA assemblies can also be located within fuselage 408. The power can be transmitted from such an actuator to an IMSA assembly mechanically or electrically, for example.

In some embodiments, an upstream or downstream IMSA comprises several propellers. For example, an upstream or downstream IMSA can comprise at least two counter-rotating or co-rotating coaxial propellers.

Note that the propellers of an upstream IMSA and corresponding downstream IMSA need not be in phase, and need not be rotating at the same angular velocities during nominal operations. In some embodiments, there is an optimal phase angle for a given distance of separation between an upstream IMSA and a downstream IMSA, where optimality can refer to the minimization of the cost of operation of the vehicle, or the maximization of the endurance of the vehicle.

Figure 17:
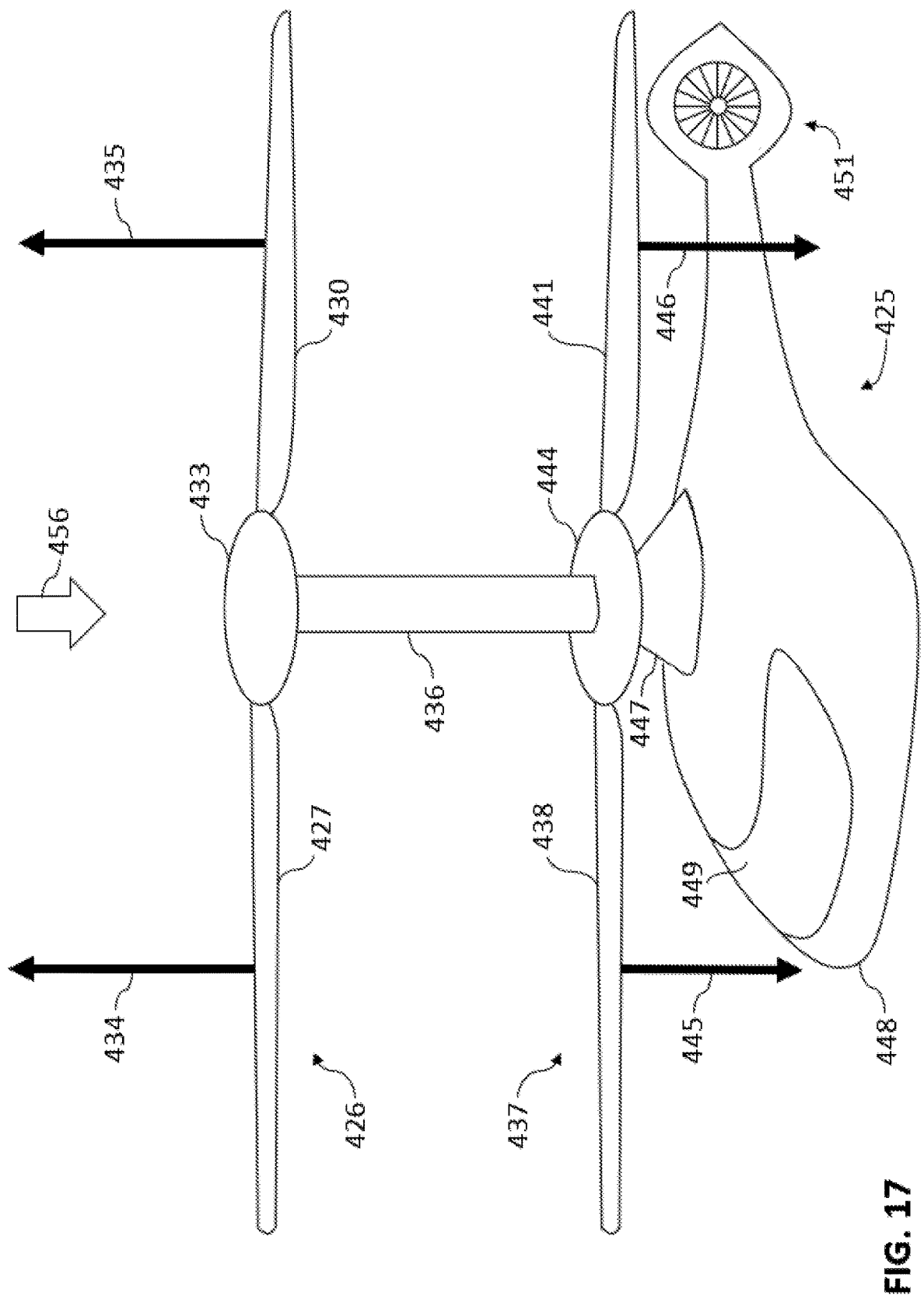

FIG. 17 is an oblique top view of another IFMA configuration 425. Some features of the apparatus shown in FIG. 17, as well as some of the principles of operation of the apparatus share similarities with the apparatus shown in the other figures, and FIG. 3 in particular, and will therefore not be described in the same detail in the context of FIG. 17, and vice versa.

IFMA configuration 425 can be described as a conventional helicopter. IFMA configuration 425 comprises a fuselage 448 with window 449, and a tail rotor assembly 451.

IFMA configuration 425 is shown in a nominal hover, where the induced flow is directed in the vertically downwards direction, as indicated by flow direction 456.

An upstream IMSA 426, is configured to produce a thrust force acting on IFMA configuration 425 which is directed in the upwards direction, as indicated by thrust vector 434 associated with a first rotor blade 427 or thrust vector 435 associated with a second rotor blade 430. First blade 427 and second blade 430 are connected to a drive shaft via a rotor hub 433. The drive shaft can be enclosed by an aerodynamic fairing 436.

An downstream IMSA 437, is configured to produce a thrust force acting on embodiment 425 which is directed in the downwards direction, as indicated by thrust vector 445 associated with a first rotor blade 438 or thrust vector 446 associated with a second rotor blade 441. First blade 438 and second blade 441 are connected to a drive shaft via a rotor hub 444. The drive shaft can be enclosed by an aerodynamic fairing 447. In some embodiments, the drive shaft of upstream IMSA 426 and downstream IMSA 437 are identical. In other embodiments, the drive shaft of upstream IMSA 426 passes through the center of the drive shaft of downstream IMSA 437 in a coaxial configuration. In other embodiments, the fuselage 448 is located between upstream IMSA 426 and downstream IMSA 437.

The main rotor system of IFMA configuration 425 can be described as an IMSA assembly comprising the upstream IMSA 426 and the downstream IMSA 437. In the hovering configuration shown in FIG. 17, the induced power consumption of the IMSA assembly is lower than the induced power consumption of an equivalent baseline or reference configuration, in which the effect of the downstream IMSA on the fluid is negligible, i.e., the thrust of the upstream IMSA is substantially equal to the net thrust requirement. In the baseline configuration an IMSA assembly can be considered to only comprise the upstream IMSA. In this case, the baseline configuration is identical to a conventional helicopter.

During a range of operating conditions in nominal level cruise, at least a portion of downstream IMSA 437 is no longer located in the wake of upstream IMSA 426. When this portion is sufficiently large, downstream IMSA 437 can be feathered. In some embodiments, the feathering of the downstream IMSA 437 can comprise the reduction of the angular velocity of the rotor blades to zero. In some embodiments, the rotor blades of downstream IMSA 437 are folded. For instance, the rotor blades can be folded into an aerodynamic fairing for nominal level cruise. In other embodiments, during nominal level cruise, the downstream IMSA 437 can be configured to produce a thrust or lift which has a positive component along the thrust of lift vector of the upstream IMSA 426. In that regard, downstream IMSA 437 and upstream IMSA 426 can be operated or configured in a similar manner as the rotors of coaxial helicopters in the prior art.

Note that the principles of some embodiments can also be applied to tiltrotors. For example, a single rotor of a tiltrotor can be replaced by two rotors separated by a support shaft, similar to the two rotors, i.e. upstream IMSA 426 and downstream IMSA 437, shown in FIG. 17. In this manner, the benefits of some embodiments can be made available for both cruising flight and hovering flight.

Figure 18:
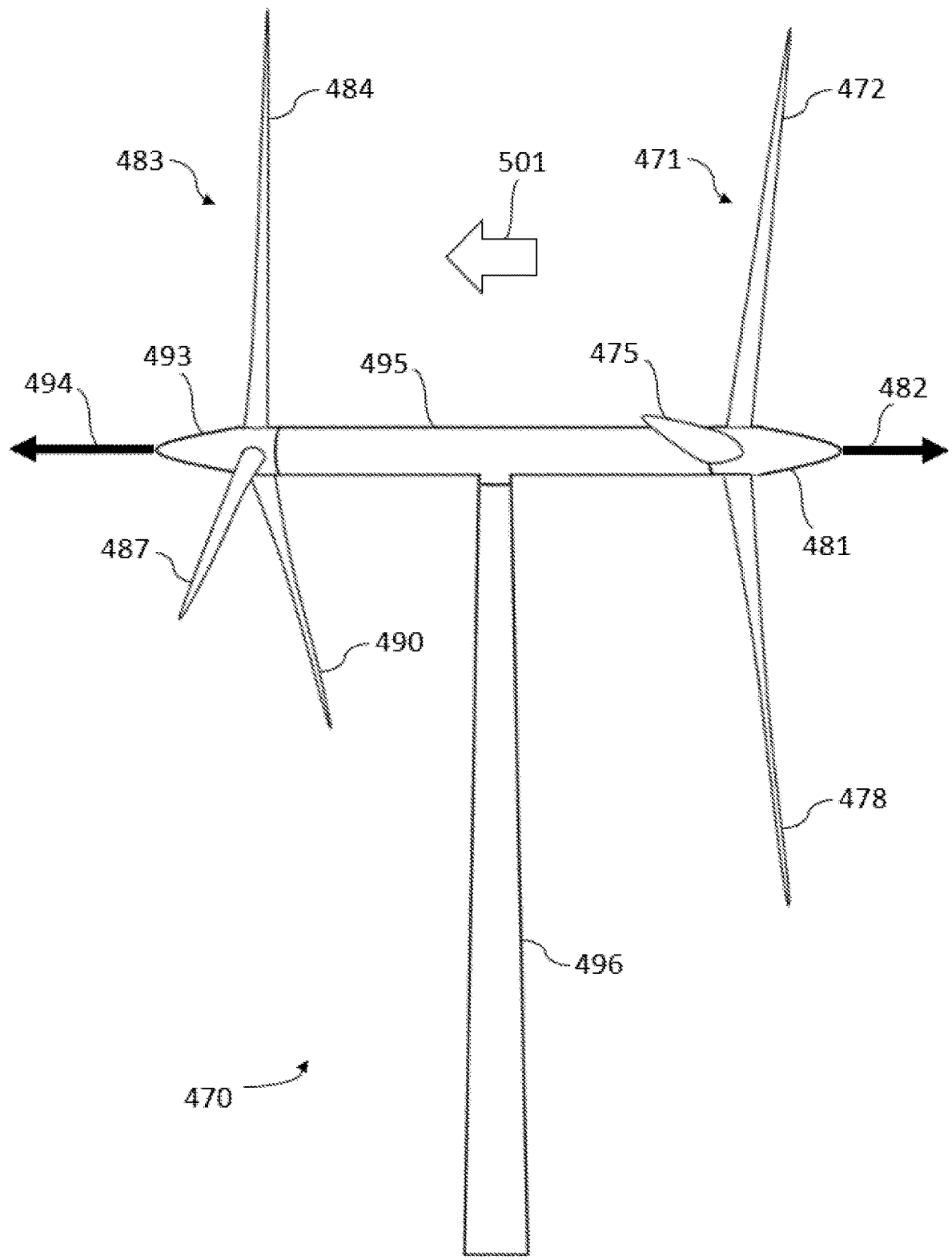

FIG. 18 is an oblique side view of another IFMA configuration 470. Some features of the apparatus shown in FIG. 18, as well as some of the principles of operation of the apparatus share similarities with the apparatus shown in the other figures, and FIG. 3 in particular, and will therefore not be described in the same detail in the context of FIG. 18, and vice versa.

IFMA configuration 470 can be described as a wind turbine. The wind direction is indicated by arrow 501. IFMA configuration 470 includes a vertical support 496 rotably connected to a horizontal nacelle 495, where the rotation axis is parallel to the vertical axis. An upstream IMSA 471 and a downstream IMSA 483 are rotably connected to nacelle 495, where the rotation axes are coaxial, and parallel to the horizontal axis.

Upstream IMSA 471 can be described as a propeller in this embodiment, and comprises a first blade 472, a second blade 478, and a third blade 475. Each blade is rotably connected to a rotor hub 481, where the rotation axis is substantially parallel to the long axis of the blade. The pitch angle of each rotor blade can be adjusted according to the wind conditions in order to optimize the performance of the wind turbine, where the performance can refer to the power extracted from the wind, for example. Upstream IMSA 471 is configured to accelerate the fluid flow, i.e. increase the magnitude of the velocity of the fluid relative to an inertial frame, at the location of the downstream IMSA 483. Upstream IMSA 471 exerts a thrust force on embodiment 470 directed in the upstream direction, as indicated by thrust vector 482.

Downstream IMSA 483 can be described as a propeller in this embodiment, and comprises a first blade 484, a second blade 490, and a third blade 475. Each blade is rotably connected to a rotor hub 493, where the rotation axis is substantially parallel to the long axis of the blade. The pitch angle of each rotor blade can be adjusted. Downstream IMSA 483 is configured to decelerate the fluid flow, i.e. decrease the magnitude of the velocity of the fluid relative to an inertial frame, downstream of downstream IMSA 483. Downstream IMSA 483 exerts a thrust force on IFMA configuration 470 directed in the downstream direction, as indicated by thrust vector 494. A portion of the power extracted by downstream IMSA 483 from the fluid is transferred to upstream IMSA 471, and a portion of this transferred power is applied to the fluid by upstream IMSA 471. As mentioned, this power can be transferred mechanically or electrically, for example.

The rotor system of IFMA configuration 470 can be described as an IMSA assembly comprising the upstream IMSA 471 and the downstream IMSA 483. In the configuration shown in FIG. 18, the power extracted by the IMSA assembly from the motion of the surrounding fluid, e.g., the wind or water current, is larger than the power extracted by an equivalent baseline or reference configuration, in which the effect of the upstream IMSA on the fluid is negligible, i.e. the thrust of the downstream IMSA in the baseline configuration is substantially equal to the net thrust of IFMA configuration 470 shown in FIG. 18. In the baseline configuration an IMSA assembly can be considered to only comprise the downstream IMSA. For the depicted configuration, the baseline configuration is identical to a conventional wind turbine. The improvement in performance is particularly pronounced at low wind or current velocities.

Figure 19:
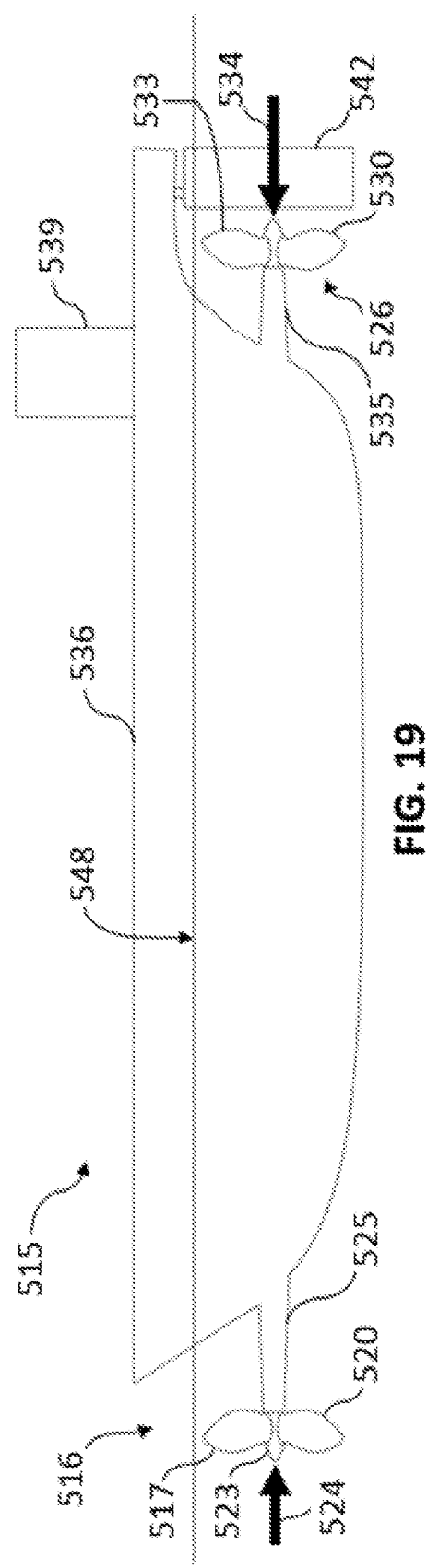
FIGS. 19-21 are side views of various IFMA configurations, according to some embodiments.

FIG. 19 is a side view of another IFMA configuration 515. Some features of the apparatus shown in FIG. 19, as well as some of the principles of operation of the apparatus share similarities with the apparatus shown in the other figures, and FIG. 7 in particular, and will therefore not be described in the same detail in the context of FIG. 19, and vice versa.

IFMA configuration 515 can also be described as a ship, with a hull 536, superstructure 539 above the water surface 548, and a rudder 542 below the surface.

An upstream IMSA 516 can be described as a propeller with at least a first propeller blade 517 and a second propeller blade 520. Each propeller blade is rotably connected to hub 523, where the rotation axis is parallel to the long axis of the blade. The pitch of each propeller blade can be adjusted to the operating conditions of the ship. Upstream IMSA 516 is supported by a fairing 525 which, in some embodiments, encloses a drive shaft which is rigidly connected to hub 523. In some embodiments, hub 523 is connected to an electric generator in a direct drive configuration. Upstream IMSA 516 is configured to decelerate the flow and reduce the local free stream flow of hull 536. Accordingly, upstream IMSA 516 exerts a thrust force on IFMA configuration 515 which is directed in the direction of fluid flow relative to hull 536, as indicated by thrust vector 524.

A downstream IMSA 526 can be described as a propeller with at least a first propeller blade 533 and a second propeller blade 530. Each propeller blade is rotably connected to hub, where the rotation axis is parallel to the long axis of the blade. The pitch of each propeller blade can be adjusted to the operating conditions of the ship. Downstream IMSA 526 is supported by a fairing 535 which, in some embodiments, encloses a drive shaft which is rigidly connected to said hub. In some embodiments, the hub is connected to an electric motor in a direct drive configuration. Downstream IMSA 526 is configured to accelerate the flow. Accordingly, downstream IMSA 526 exerts a thrust force on IFMA configuration 515 which is directed in the opposite direction of fluid flow relative to hull 536, as indicated by thrust vector 534.

The upstream IMSA 516 can reduce the drag of the IFMA configuration 515. The drag reduction can comprise a reduction in the viscous drag of hull 536, and/or a reduction in the gravitational wave drag of hull 536. The drag reduction is associated with the modification of the spatial profile of the fluid flow velocity relative to hull 536 by the upstream IMSA 516. The reduction of the magnitude of the local free stream fluid flow velocity of hull 536, the reduction in the fluid flow velocity at, and relative to, the wetted surface of hull 536, as well as the generation of a more favorable velocity profile in the vicinity of wetted surface of hull 536, by upstream IMSA 516 can contribute to said reduction in viscous drag. A more favorable velocity profile can comprise a reduced peak spatial fluid flow velocity gradient, or a reduced spatial average magnitude of the spatial fluid flow velocity gradient in the vicinity of IFMA configuration 515, for example. The reduction in the wave drag can be a result of the more gradual change in the fluid flow direction as the fluid flows around IFMA configuration 515, or a more gradual displacement of the fluid by IFMA configuration 515 as a result of the deceleration of the fluid flow by upstream IMSA 516 and acceleration of the fluid flow by IMSA 526. The strength of the disturbance to the fluid flow by IFMA configuration 515 can thus be reduced. In some embodiments, the upstream IMSA 516 can be configured to perform a similar function as the bulbous bow found on conventional ship hull designs, for example.

Figure 20:
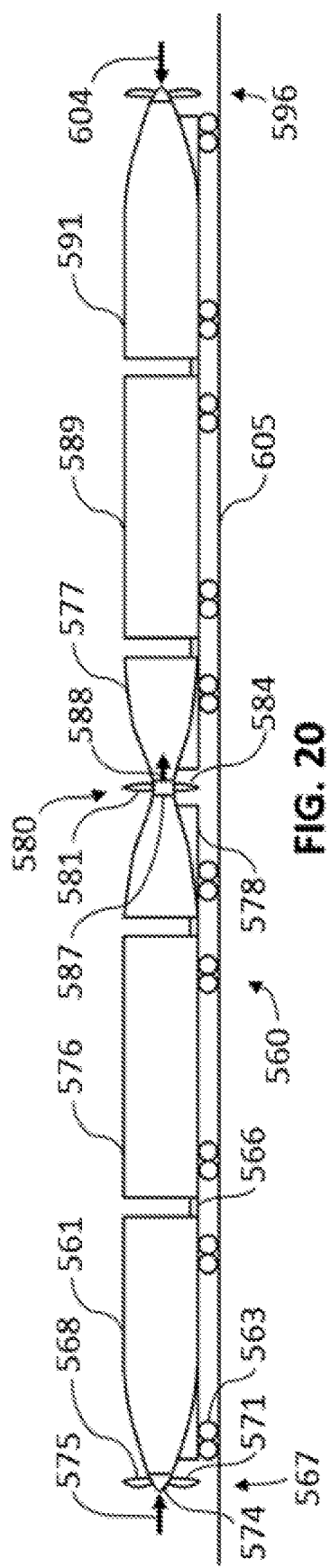

FIG. 20 is a side view of another IFMA configuration 560. Some features of the apparatus shown in FIG. 20, as well as some of the principles of operation of the apparatus share similarities with the apparatus shown in the other figures, and FIG. 7 in particular, and will therefore not be described in the same detail in the context of FIG. 20, and vice versa.

IFMA configuration 560 can also be described as a train or a truck, and comprises a first wagon 561, a second wagon 576, a third wagon 577, a fourth wagon 589, and a fifth wagon 591. Each wagon is supported by wheels, such as wheel 563, which facilitate the motion of the wagon relative to road or rails 605. Each wagon is connected to an adjacent wagon by a connection, such as connection 566. The wagons are rotably connected to the wheels by a supporting structure, such as supporting structure 578.

An upstream IMSA 567 can be described as a propeller with at least a first propeller blade 568 and a second propeller blade 571. Each propeller blade is rotably connected to hub 574, where the rotation axis is parallel to the long axis of the blade. The pitch of each propeller blade can be adjusted to the operating conditions of the vehicle. Upstream IMSA 567 is configured to decelerate the flow and reduce the local free stream flow of the remaining vehicle. Accordingly, upstream IMSA 567 exerts a thrust force on IFMA configuration 560 which is directed in the direction of fluid flow relative to IFMA configuration 560, as indicated by thrust vector 575.

A downstream IMSA 596 can be described as a propeller. In IFMA configuration 560, first wagon 561 can be identical to fifth wagon 591 in order to reduce the manufacturing cost of embodiment 560. Note that first wagon 561 is operated in a different manner as fifth wagon 591.

Downstream IMSA 596 is configured to accelerate the flow. Accordingly, downstream IMSA 596 exerts a thrust force on IFMA configuration 560 that is directed in the opposite direction of fluid flow relative to embodiment 560, as indicated by thrust vector 604.

Due to the length of IFMA configuration 560, the drag reducing effect of upstream IMSA 574 is reduced as the distance from upstream IMSA 574 along the length of embodiment 560 is increased. This can be due to the viscous effects, for instance. A middle IMSA 580 is configured to correct for any distortional effects on the actual velocity profile compared to the ideal velocity profile in the vicinity of the outside surface of IFMA configuration 560. Middle IMSA 580 comprises at least a first propeller blade 581 and a second propeller blade 584. Each propeller blade is rotably connected to hub 587, where the rotation axis is parallel to the long axis of the blade. The pitch of each propeller blade can be adjusted to the operating conditions of the vehicle. Middle IMSA 580 is configured to decelerate the flow and reduce the local free stream flow of the remaining vehicle. Accordingly, middle IMSA 580 exerts a thrust force on IFMA configuration 560 that is directed in the direction of fluid flow relative to embodiment 560, as indicated by thrust vector 588.

In some embodiments, the sum of the drag force acting on the portions of the vehicle between middle IMSA 580 and downstream IMSA 596 and the thrust or drag acting on middle IMSA 580 is smaller than the drag force acting between a third wagon and the last wagon of the embodiment in the scenario in which there is no middle IMSA, i.e. in the scenario in which the third wagon is configured in a similar manner as the second wagon 576. For some embodiments, for some operating conditions, the net drag force acting on an embodiment without a dedicated middle IMSA, such as middle IMSA 580 is larger than the net drag force acting on IFMA configuration 560. Note that some embodiments can comprise several middle IMSAs, configured in a similar manner as middle IMSA 580. Note that several wagons, such as wagon 576, can be located between an upstream, middle, or downstream IMSA. In some embodiments, the connection between adjacent wagons comprises an aerodynamic fairing configured to allow wagons to rotate relative to each other during curves or bends in the road or rail.

Upstream IMSA 567 and middle IMSA 580 can be configured to extract energy from the surrounding fluid, while downstream IMSA 596 can be configured to apply at least a portion of the extracted energy to the fluid surrounding IFMA configuration 560. Note that embodiments similar to IFMA configuration 560 can include a separate traction motor configured to contribute to the propulsion of the embodiment by transmitting a torque to at least one wheel. In other embodiments, any outstanding thrust requirements of the embodiment are provided by downstream IMSA 596.

Figure 21:
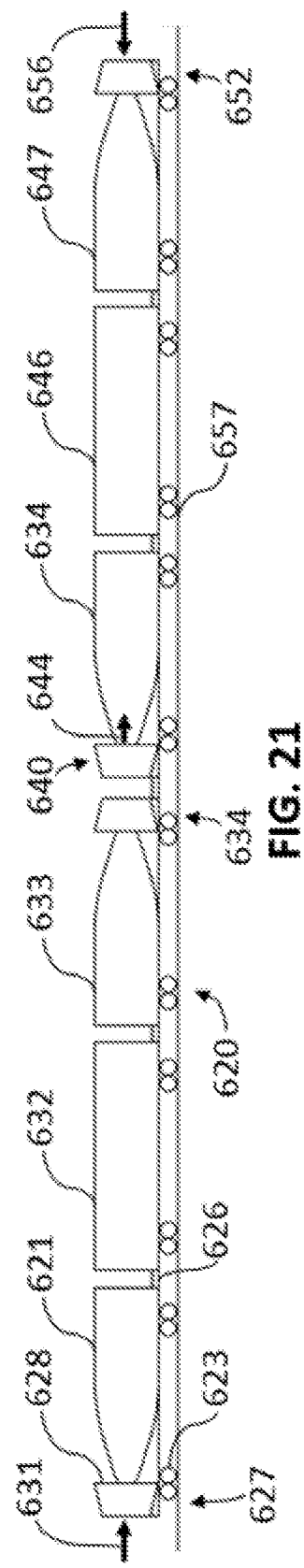

FIG. 21 is a side view of another IFMA configuration 620. Some features of the apparatus shown in FIG. 21, as well as some of the principles of operation of the apparatus share similarities with the apparatus shown in the other figures, and FIG. 7 and FIG. 20 in particular, and will therefore not be described in the same detail in the context of FIG. 21, and vice versa.

IFMA configuration 620 can also be described as a train or a truck, and comprises a first wagon 621, a second wagon 632, a third wagon 633, a fourth wagon 634, a fifth wagon 646, and a sixth wagon 647. Each wagon is supported by wheels, such as wheel 623, which facilitate the motion of the wagon relative to road or rails 657. Each wagon is connected to an adjacent wagon by a connection, such as connection 626. The wagons are rotably connected to the wheels by a supporting structure.

An upstream IMSA 627 can be described as a ducted fan, comprising a duct 628 surrounding a propeller with at least a first propeller blade and a second propeller blade. Each propeller blade is rotably connected to a hub, where the rotation axis is parallel to the long axis of the blade. The pitch of each propeller blade can be adjusted to the operating conditions of the vehicle. Upstream IMSA 627 is configured to decelerate the flow and reduce the local free stream flow of the remaining vehicle. Accordingly, upstream IMSA 627 exerts a thrust force on embodiment 620 which is directed in the direction of fluid flow relative to embodiment 620, as indicated by thrust vector 631.

A downstream IMSA 652 can be described as a ducted fan. In IFMA configuration 620, first wagon 621 is identical to sixth wagon 647 in order to reduce the manufacturing cost of embodiment 620. Note that first wagon 621 is operated in a different manner as sixth wagon 647. Downstream IMSA 652 is configured to accelerate the flow. Accordingly, downstream IMSA 652 exerts a thrust force on embodiment 620 which is directed in the opposite direction of fluid flow relative to embodiment 620, as indicated by thrust vector 656.

IFMA configuration 620 can include one middle IMSA, similar to embodiment 560. In IFMA configuration 620, the middle IMSA is embodied by two wagons instead of one, i.e. the third wagon 633 and the fourth wagon 634. Both of these wagons are identical to sixth wagon 647 or first wagon 621 in order to reduce the manufacturing cost of embodiment 620. The ducted fan 634 of the third wagon 633 is feathered in this embodiment. The ducted fan 640 of the fourth wagon 634 is configured in a similar manner as middle IMSA 580 in FIG. 20. Accordingly, IMSA 640 exerts a thrust force on embodiment 620 which is directed in the direction of fluid flow relative to embodiment 620, as indicated by thrust vector 644.

The upstream IMSAs can reduce the drag of the IFMA configurations 560 or 620. The drag reduction can comprise a reduction in the viscous drag of the wagons. The drag reduction is associated with the modification of the spatial profile of the fluid flow velocity relative to, and in the vicinity of, IFMA configurations 560 or 620 by the upstream IMSAs. The modification can refer to the reduction in the average magnitude of the spatial velocity gradient of the fluid flow. The configuration of the upstream and downstream IMSAs can be optimized mathematically in a manner which minimizes the total power consumption of the IFMA configurations 560 or 620 subject to constraints, such as structural or financial limits, for example.

Unless specified or clear from context, the term "or" is equivalent to "and/or" throughout this paper. The embodiments and methods described in this paper are only meant to exemplify and illustrate the principles of the embodiments disclosed herein. Embodiments can be carried out in several different ways that are not shown and therefore are not limited to the examples, arrangements, configurations, or methods of operation described in this paper or depicted in the drawings. Based on the teachings provided herein, those skilled in the art now will be able to devise numerous alternative examples, embodiments, arrangements, configurations, or methods of operation not explicitly shown or described.

What is claimed:

1. An intentional fluid manipulation apparatus (IFMA) assembly, the IFMA comprising:
    an upstream intentional momentum shedding apparatus (IMSA) configured to impart a first induced velocity to a local free stream flow during a nominal operation requirement;
    at least a downstream IMSA, arranged such that a fluid passing through both the upstream IMSA and downstream IMSA forms a streamtube, with the downstream IMSA being configured to impart a second induced velocity to the local free stream flow within at least a portion of the streamtube, wherein the second induced velocity at the location of the downstream IMSA has a component in a direction opposite to the direction of the first induced velocity at the location of the downstream IMSA; and
    wherein the upstream IMSA is configured to deliver more power to the fluid within the streamtube than is removed from the fluid within the streamtube by the downstream IMSA during a first nominal operation requirement, wherein the first nominal operation requirement comprises delivering a net power to the fluid within the streamtube, or
    wherein the upstream IMSA is configured to deliver less power to the fluid within the streamtube than is removed from the fluid within the streamtube by the downstream IMSA during a second nominal operation requirement, wherein the second nominal operation requirement comprises removing a net power from the fluid within the streamtube,
    wherein the net power is calculated from the difference of the far wake portion of the streamtube and the free stream portion of the streamtube.

2. The IFMA assembly of claim 1, wherein upstream IMSA is configured to produce a first thrust within the streamtube, and wherein the downstream IMSA is configured to produce a second thrust with a vector component parallel to, and aligned with, the direction of an induced velocity vector of the upstream IMSA at the location of the downstream IMSA within the streamtube.

3. The IFMA assembly of claim 1, wherein the first or second nominal operation requirement comprises generating a net thrust within the streamtube, wherein the net thrust comprises a first thrust vector of the upstream IMSA and a second thrust vector of the downstream IMSA in an inertial frame, wherein the first thrust vector magnitude can be larger or smaller than the second thrust vector magnitude, wherein the net thrust is calculated from the difference of the far wake portion of the streamtube and the free stream portion of the streamtube.

4. The IFMA assembly of claim 1, wherein at least a portion of one of the upstream IMSA or downstream IMSA extracts power from a non-zero free stream flow within the streamtube.

5. The IFMA assembly of claim 1, wherein the upstream IMSA and downstream IMSA comprise open rotors or ducted rotors.

6. The IFMA assembly of claim 5, wherein a pitch angle of rotor blades relative to a rotor hub of a propeller can be modified.

7. The IFMA assembly of claim 1, wherein the first or the second induced velocity has a non-zero component perpendicular to the local free stream flow at the upstream IMSA or the downstream IMSA, respectively.

8. The IFMA assembly of claim 1, wherein the first or the second induced velocity has a non-zero component parallel to the local free stream flow at the upstream IMSA or the downstream IMSA, respectively.

9. The IFMA assembly of claim 8, wherein the first induced velocity has a non-zero component in the direction opposite the local free stream flow direction at the upstream IMSA.

10. The IFMA assembly of claim 1, further comprising a power transfer apparatus to transfer power between the upstream IMSA and the downstream IMSA wherein power can be delivered form the downstream IMSA to the upstream IMSA.

11. The IFMA assembly of claim 10, wherein the power is transferred mechanically.

12. The IFMA assembly of claim 11, wherein the power transfer apparatus comprises a drive shaft, gear train, and/or clutch.

13. The IFMA assembly of claim 10, wherein the power is transferred electrically.

14. The IFMA assembly of claim 13, wherein the downstream IMSA drives an electric generator, the electric power of which is delivered to an electric motor coupled to the upstream IMSA, or wherein the upstream IMSA drives an electric generator, the electric power of which is delivered to an electric motor coupled to the downstream IMSA.

15. The IFMA assembly of claim 10, wherein power is delivered from the downstream IMSA to the upstream IMSA.

16. The IFMA assembly of claim 1, wherein the downstream IMSA is configured to extract power from the fluid.

17. The IFMA assembly of claim 16, wherein the power extracted from the fluid by the downstream IMSA is larger in magnitude than the power delivered to the fluid by the upstream IMSA.

18. The IFMA assembly of claim 16, wherein the power extracted from the fluid by the downstream IMSA is smaller in magnitude than the power delivered to the fluid by the upstream IMSA.

19. The IFMA assembly of claim 1, wherein the upstream IMSA is configured to extract power from the fluid.

20. The IFMA assembly of claim 19, wherein the power extracted from the fluid by the upstream IMSA is larger in magnitude than the power delivered to the fluid by the downstream IMSA.

21. The IFMA assembly of claim 19, wherein the power extracted from the fluid by the upstream IMSA is smaller in magnitude than the power delivered to the fluid by the downstream IMSA.

22. The IFMA assembly of claim 1, wherein the upstream IMSA is configured to intentionally both extract power from the fluid and deliver power to the fluid, and the downstream IMSA is configured to intentionally both extract power from the fluid and deliver power to the fluid during nominal operations.

23. The IFMA assembly of claim 1, wherein the first induced velocity is directed in a downstream direction of the local free stream flow at the upstream IMSA, and the second induced velocity is directed in an upstream direction of the local free stream flow at the downstream IMSA, wherein the power extracted from the fluid by the downstream IMSA within the streamtube is larger or smaller in magnitude than the power delivered to the fluid by the upstream IMSA within the streamtube.

24. The IFMA assembly of claim 1, wherein the mass flow rate of fluid in the streamtube for a given net thrust is increased compared to a scenario in which the downstream IMSA has a negligible effect on the fluid flow.

25. The IFMA assembly of claim 2, wherein the first thrust vector has a non-zero first component directed in the upstream direction of the local free stream flow at the upstream IMSA, and wherein the second thrust vector has a non-zero second component directed in the downstream direction of the local free stream flow at the downstream IMSA, wherein the magnitude of the first component is larger or smaller than the magnitude of the second component.

26. The IFMA assembly of claim 1, wherein an induced power associated with the production of a net thrust within the streamtube is reduced compared to a scenario in which the downstream IMSA has a negligible effect on the fluid flow, wherein the induced power can be positive or negative.

* * * * *